US008591361B2

(12) United States Patent
Hisada et al.

(10) Patent No.: US 8,591,361 B2
(45) Date of Patent: Nov. 26, 2013

(54) VEHICLE DRIVE DEVICE

(75) Inventors: Hideki Hisada, Kawasaki (JP); Shigeki Takami, Anjo (JP); Masaki Yoshida, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 100 days.

(21) Appl. No.: 13/448,829

(22) Filed: Apr. 17, 2012

(65) Prior Publication Data

US 2012/0270698 A1   Oct. 25, 2012

(30) Foreign Application Priority Data

Apr. 20, 2011   (JP) ................................. 2011-094322

(51) Int. Cl.
*F16H 3/72*   (2006.01)
(52) U.S. Cl.
USPC .......... 475/5; 477/5; 180/65.235; 180/65.265; 701/22
(58) Field of Classification Search
USPC ................. 475/5; 477/5; 180/65.235, 65.265; 701/22
See application file for complete search history.

(56) References Cited

U.S. PATENT DOCUMENTS

| | | | | |
|---|---|---|---|---|
| 6,135,914 | A * | 10/2000 | Yamaguchi et al. | 477/3 |
| 6,722,456 | B2 * | 4/2004 | Hisada | 180/65.235 |
| 6,883,626 | B2 * | 4/2005 | Aoki et al. | 180/65.235 |
| 6,902,018 | B2 * | 6/2005 | Hisada et al. | 180/65.1 |
| 7,340,330 | B2 * | 3/2008 | Okoshi et al. | 701/22 |
| 7,565,938 | B2 * | 7/2009 | Hisada et al. | 180/65.1 |
| 8,052,570 | B2 | 11/2011 | Kumazaki et al. | |
| 8,414,451 | B2 * | 4/2013 | Hisada et al. | 477/5 |
| 8,423,222 | B2 * | 4/2013 | Hisada et al. | 701/22 |
| 8,506,451 | B2 * | 8/2013 | Takami et al. | 477/5 |
| 2002/0079147 | A1 * | 6/2002 | Yamaguchi et al. | 180/65.2 |
| 2005/0167170 | A1 * | 8/2005 | Hisada et al. | 180/65.2 |
| 2005/0283283 | A1 * | 12/2005 | Hisada et al. | 701/22 |
| 2012/0265387 | A1 * | 10/2012 | Hisada et al. | 701/22 |
| 2012/0270697 | A1 * | 10/2012 | Takami et al. | 477/5 |
| 2012/0270698 | A1 * | 10/2012 | Hisada et al. | 477/5 |

FOREIGN PATENT DOCUMENTS

| | | |
|---|---|---|
| JP | A-2009-067270 | 4/2009 |
| JP | A-2009-120125 | 6/2009 |
| JP | A-2010-076678 | 4/2010 |

OTHER PUBLICATIONS

Partial English-language translation of Japanese Office Action issued in Application No. 2011-094322; Dated May 2, 2013.

* cited by examiner

*Primary Examiner* — Derek D Knight
(74) *Attorney, Agent, or Firm* — Oliff & Berridge, PLC

(57) ABSTRACT

A vehicle drive device includes an input coupled to an internal combustion engine; an output coupled to wheels; first and second rotary electric machines; a differential including at least three rotary elements; a control; and an engagement device. The control determines, when engine stop conditions are established while the engagement device is drivably connected, the engine is operating, and the output member is rotating, whether rotation of the first electric machine when stop conditions are established is opposite to rotation of the first electric machine when rotation of the engine stops; executes torque control where the first electric machine outputs torque to reduce the rotational speed of the engine when the stop establishing rotational direction is opposite to the subject rotational direction; and issues a command to release the drivable connection when the rotational speed of the first electric machine falls within a rotational speed range that includes zero.

20 Claims, 13 Drawing Sheets

F I G . 1
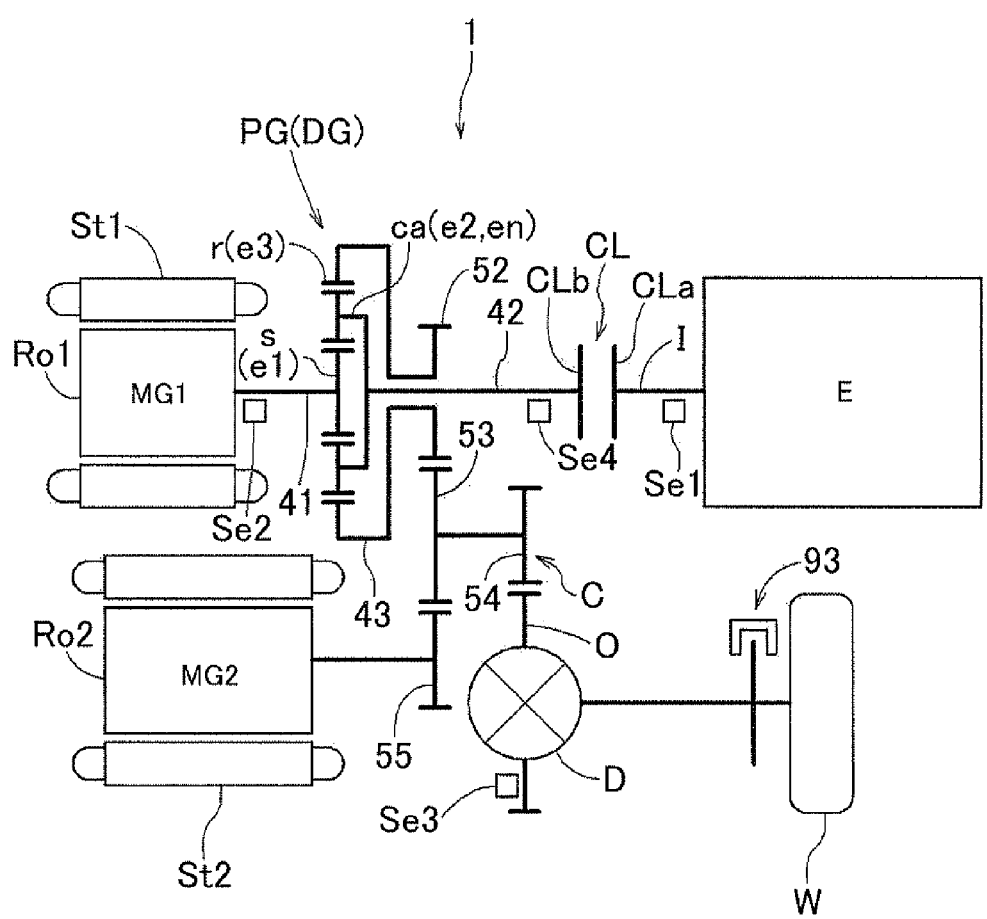

F I G . 7
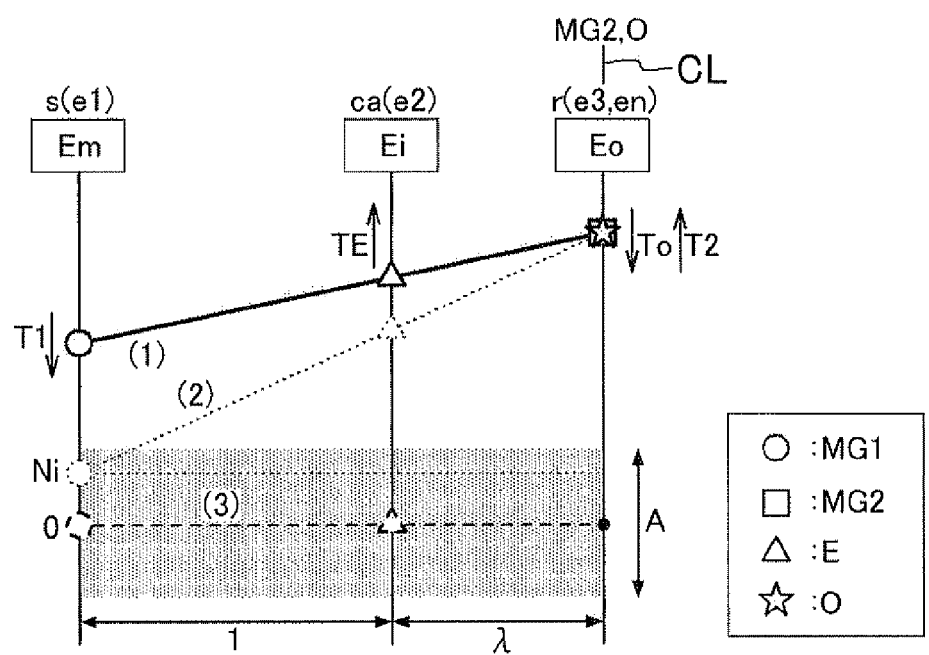

F I G . 15
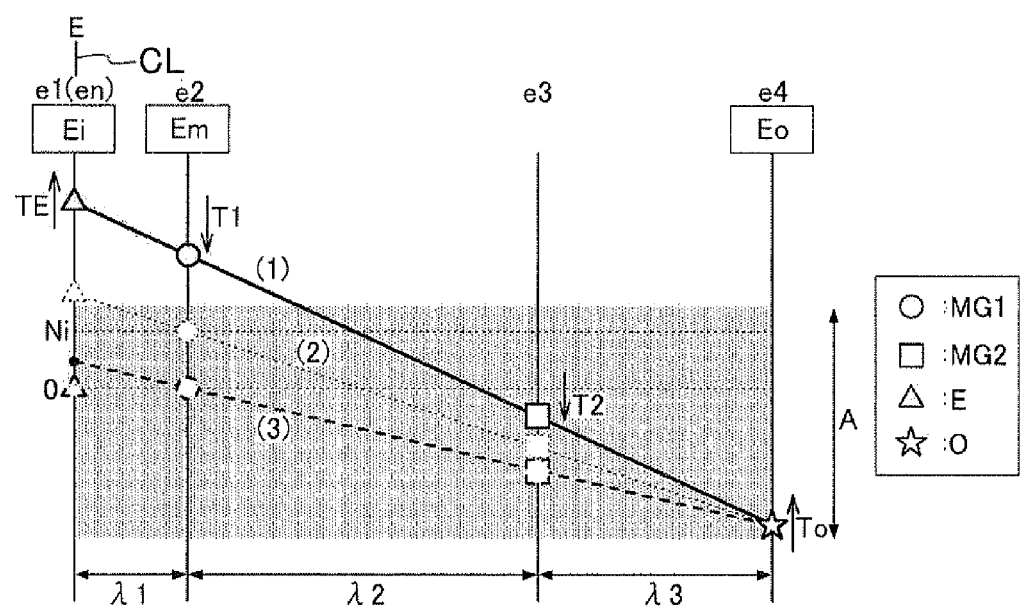

VEHICLE DRIVE DEVICE

INCORPORATION BY REFERENCE

The disclosure of Japanese Patent Application No. 2011-094322 filed on Apr. 20, 2011 including the specification, drawings and abstract is incorporated herein by reference in its entirety.

BACKGROUND OF THE INVENTION

The present invention relates to a vehicle drive device including an input member drivably coupled to an internal combustion engine, an output member drivably coupled to wheels, a first rotary electric machine, a second rotary electric machine, a differential gear device including at least three rotary elements, and a control device.

DESCRIPTION OF THE RELATED ART

An example of the vehicle drive device described above according to the related art is described in Japanese Patent Application Publication No. 2010-76678 (JP 2010-76678 A) (paragraph 0049 etc.). JP 2010-76678 A describes a device in which a differential gear device is formed by a planetary gear mechanism including three rotary elements, namely a sun gear to which a first rotary electric machine is drivably coupled, a carrier to which an input member is drivably coupled, and a ring gear to which a second rotary electric machine and an output member are drivably coupled. Such a configuration makes it possible to establish a hybrid travel mode, in which the vehicle is run utilizing torque of the internal combustion engine, and an electric travel mode, in which the vehicle is run using torque of the second rotary electric machine with the internal combustion engine stopped. The vehicle drive device further includes an engagement device capable of releasing drivable connection between the carrier and the input member (internal combustion engine). The engagement device is controlled to a state in which drivable connection between the carrier and the input member is secured (hereinafter referred to as "coupled state") during execution of the hybrid travel mode, and to a state in which drivable connection between the carrier and the input member is released (hereinafter referred to as "decoupled state") during execution of the electric travel mode. This allows the internal combustion engine to be disconnected from the planetary gear mechanism during execution of the electric travel mode, which enables positively controlling the rotational speed of the first rotary electric machine to rotate the carrier and to drive an accessory utilizing rotation of the carrier as described in JP 2010-76678 A, for example.

In a configuration in which the engagement device is brought into the decoupled state during execution of the electric travel mode, as in the configuration according to JP 2010-76678 A, it is necessary to stop the internal combustion engine and to switch the engagement device from the coupled state to the decoupled state when switching is made from the hybrid travel mode to the electric travel mode as described in paragraph 0049 of Japanese JP 2010-76678 A. In this event, in the configuration according to JP 2010-76678 A, the engagement device is automatically switched into the decoupled state by stopping fuel injection of the internal combustion engine. JP 2010-76678 A also describes switching the engagement device to the decoupled state by controlling a hydraulic pressure.

However, JP 2010-76678 A does not specifically describe the timing to switch the engagement device from the coupled state to the decoupled state. Therefore, there has not been revealed a configuration in which the engagement device can be switched from the coupled state to the decoupled state at a timing that is suitable from the viewpoint of energy efficiency, which is important for the vehicle drive device described above.

SUMMARY OF THE INVENTION

In view of the foregoing, it is desirable to provide a vehicle drive device capable of switching an engagement device from a coupled state to a decoupled state at a timing that is suitable from the viewpoint of energy efficiency.

An aspect of the present invention provides a vehicle drive device including an input member drivably coupled to an internal combustion engine, an output member drivably coupled to wheels, a first rotary electric machine, a second rotary electric machine, a differential gear device including at least three rotary elements, a control device, and an engagement device. The input member, the output member, and the first rotary electric machine are drivably coupled to different rotary elements of the differential gear device via no other rotary element of the differential gear device. The second rotary electric machine is drivably coupled to one of the rotary elements of the differential gear device other than the rotary element to which the first rotary electric machine is drivably coupled via no other rotary element of the differential gear device. The engagement device is capable of releasing drivable connection between one of the input member, the output member, and the first rotary electric machine and the corresponding rotary element of the differential gear device. The control device includes: a rotational direction determination section that, when internal combustion engine stop conditions for stopping the internal combustion engine are established in a state in which the drivable connection made by the engagement device is maintained, the internal combustion engine is in operation, and the output member is rotating, determines whether or not a stop condition establishing rotational direction, which is a rotational direction of the first rotary electric machine at the time when the internal combustion engine stop conditions are established, is opposite to a subject rotational direction, which is a rotational direction of the first rotary electric machine at an operation point at which a rotational speed of the internal combustion engine becomes zero; a rotation reducing torque control section that executes rotation reducing torque control in which the first rotary electric machine is caused to output rotation reducing torque in a direction to reduce the rotational speed of the internal combustion engine on condition that it is determined that the stop condition establishing rotational direction is opposite to the subject rotational direction; and a connection release command section that issues a command to release the drivable connection made by the engagement device on condition that the rotational speed of the first rotary electric machine falls within a connection release rotational speed range set so as to include zero.

The terms "drivably coupled" and "drivable connection" as used herein refer to a state in which two rotary elements are coupled to each other in such a way that enables transfer of a drive force, which includes a state in which the two rotary elements are coupled to each other to rotate together with each other, and a state in which the two rotary elements are coupled to each other via one or two or more transmission members in such a way that enables transfer of a drive force. Examples of such transmission members include various members that transfer rotation at an equal speed or a changed speed, such as a shaft, a gear mechanism, a belt, and a chain.

Additional examples of such transmission members include engagement elements that selectively transfer rotation and a drive force, such as a friction engagement element and a meshing-type engagement element. The term "drive force" is used as a synonym for "torque".

Herein, a differential gear mechanism including three rotary elements such as a planetary gear mechanism including a sun gear, a carrier, and a ring gear is used, and the differential gear mechanism alone, or a device obtained by combining a plurality of differential gear mechanisms with each other, is referred to as a differential gear device.

The term "rotary electric machine" as used herein refers to any of a motor (electric motor), a generator (electric generator), and a motor generator that functions both as a motor and as a generator as necessary.

According to the aspect described above, the direction of torque (rotation reducing torque) output from the first rotary electric machine during execution of the rotation reducing torque control coincides with the direction to reduce the rotational speed of the internal combustion engine. Immediately after the internal combustion engine is stopped (at least one of fuel injection and ignition is stopped) upon establishment of the internal combustion engine stop conditions, a rotation output member of the internal combustion engine is subjected to inertial torque matching the moment of inertia of the internal combustion engine in the direction to continuously rotate. Therefore, the rotation reducing torque is defined as torque with a predetermined magnitude that resists against the inertial torque. The rotation reducing torque control is executed on condition that it is determined that the stop condition establishing rotational direction is opposite to the subject rotational direction. Therefore, the direction of the rotation reducing torque at the start of execution of the rotation reducing torque control coincides with the direction to reduce the absolute value of the rotational speed of the first rotary electric machine (direction to generate electricity). Hence, executing the rotation reducing torque control allows the first rotary electric machine to regenerate (generate) electric power matching the magnitude of the inertial torque of the internal combustion engine by effectively utilizing the inertial torque.

The first rotary electric machine regenerates electric power utilizing the inertial torque of the internal combustion engine with the engagement device in the coupled state. Therefore, it seems to be preferable that the engagement device should be maintained in the coupled state during a period until the inertial torque becomes zero. When the rotational direction of the first rotary electric machine becomes the same as the subject rotational direction, however, the direction of the rotation reducing torque becomes the direction to increase the absolute value of the rotational speed of the first rotary electric machine, and therefore electric power may not be regenerated utilizing the inertial torque of the internal combustion engine. In the aspect of the present invention, in view of this fact, the command to release the drivable connection made by the engagement device is issued to switch the engagement device from the coupled state to the decoupled state on condition that the rotational speed of the first rotary electric machine falls within the connection release rotational speed range set so as to include zero. This makes it possible to improve the energy efficiency by generating electricity by effectively utilizing the inertial torque of the internal combustion engine, and to suppress energy loss due to unnecessary rotation of the first rotary electric machine.

The connection release command section may issue the command to release the drivable connection made by the engagement device before the rotational direction of the first rotary electric machine becomes the same as the subject rotational direction.

According to this configuration, it is possible to suppress energy loss caused by the first rotary electric machine rotating unnecessarily while the first rotary electric machine is not able to generate electricity, which enhances the energy efficiency.

The rotation reducing torque control section may stop the rotation reducing torque control before the rotational direction of the first rotary electric machine becomes the same as the subject rotational direction.

According to this configuration, it is possible to suppress power running with the first rotary electric machine outputting torque (rotation reducing torque) that resists against the inertial torque of the internal combustion engine in a rotational speed range in which electric power may not be regenerated utilizing the inertial torque, which further enhances the energy efficiency.

The control device may execute fluctuation suppressing control in which the second rotary electric machine is caused to output fluctuation suppressing torque for suppressing torque fluctuations to be transferred to the output member via the differential gear device because of variations in state of operation of the first rotary electric machine or variations in state of engagement of the engagement device.

According to this configuration, it is possible to suppress torque fluctuations to be transferred to the output member drivably coupled to the wheels. Hence, it is possible to suppress shock to the vehicle when control for stopping the internal combustion engine is executed upon establishment of the internal combustion engine stop conditions.

The second rotary electric machine may be drivably coupled to the rotary element of the differential gear device to which the output member is drivably coupled via no other rotary element of the differential gear device.

According to this configuration, it is possible to establish an electric travel mode in which torque of the second rotary electric machine is transferred to the output member to drive the wheels with the internal combustion engine stopped irrespective of which of the input member, the output member, and the first rotary electric machine is the member for which the engagement device is capable of releasing drivable connection with the corresponding rotary element of the differential gear device. Hence, it is possible to enhance the degree of freedom in designing the arrangement of the engagement device, which makes the vehicle drive device according to the aspect of the present invention widely applicable.

In a configuration in which the engagement device is capable of releasing the drivable connection between the input member and the corresponding rotary element of the differential gear device, for example, the differential gear device may include three rotary elements that are a first rotary element, a second rotary element, and a third rotary element in the order of rotational speed; the first rotary electric machine may be drivably coupled to the first rotary element, the input member may be drivably coupled to the second rotary element, and the second rotary electric machine and the output member may be drivably coupled to the third rotary element, via no other rotary element of the differential gear device; and the engagement device may be provided on a power transfer path between the input member and the second rotary element.

The term "order of rotational speed" may refer to either of an order from the high speed side to the low speed side and an order from the low speed side to the high speed side depending on the rotating state of each differential gear mechanism. In either case, the order of the rotary elements is invariable.

Alternatively, the second rotary electric machine may be drivably coupled to one of the rotary elements of the differential gear device other than the rotary element to which the first rotary electric machine is drivably coupled or the rotary element to which the output member is drivably coupled via no other rotary element of the differential gear device; and the engagement device may be provided on a power transfer path between the input member and the rotary element of the differential gear device to which the input member is drivably coupled via no other rotary element.

Also according to this configuration, it is possible to establish the electric travel mode in which torque of the second rotary electric machine is transferred to the output member to drive the wheels with the internal combustion engine stopped.

BRIEF DESCRIPTION OF THE DRAWINGS

FIG. 1 is a skeleton diagram showing the mechanical configuration of a vehicle drive device according to a first embodiment of the present invention;

FIG. 7 is a velocity diagram illustrating operation of internal combustion engine stop control according to the second embodiment of the present invention;

FIG. 15 is a velocity diagram illustrating operation of internal combustion engine stop control according to another embodiment of the present invention.

DETAILED DESCRIPTION OF THE EMBODIMENTS

1. First Embodiment

Figure 2:
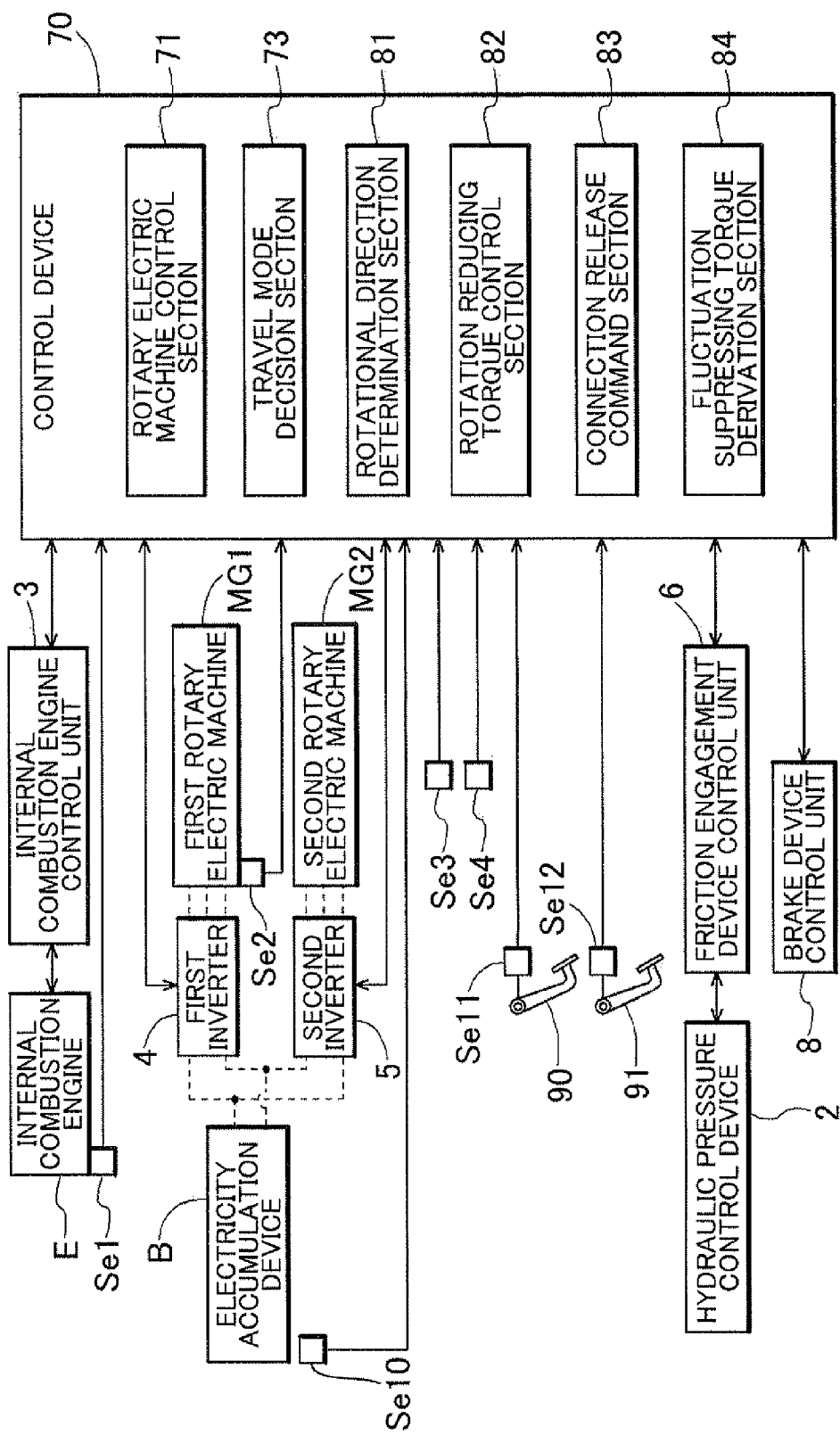
FIG. 2 is a schematic diagram showing the system configuration of the vehicle drive device according to the first embodiment of the present invention.

A vehicle drive device according to a first embodiment of the present invention will be described with reference to the drawings. As shown in FIG. 1, a vehicle drive device 1 according to the embodiment is a drive device (hybrid vehicle drive device) that drives a vehicle (hybrid vehicle) including both an internal combustion engine E and rotary electric machines MG1 and MG2 each serving as a drive force source for wheels. The vehicle drive device 1 according to the embodiment also includes a control device 70 (see FIG. 2). The control device 70 controls operation of the drive force sources and a friction engagement device CL on the basis of the system configuration shown in FIG. 2. In FIG. 2, broken lines each indicate a transfer path for electric power, and solid arrows each indicate a transfer path for various types of information.

In the embodiment, as shown in FIG. 1, a differential gear device DG provided in the vehicle drive device 1 is formed by a planetary gear mechanism PG including a sun gear s, a carrier ca, and a ring gear r each serving as a rotary element. The first rotary electric machine MG1 is drivably coupled to the sun gear s, an input member I is drivably coupled to the carrier ca, and the second rotary electric machine MG2 and an output member O are drivably coupled to the ring gear r, via no other rotary element of the planetary gear mechanism PG. The input member I is drivably coupled to the internal combustion engine E. The output member O is drivably coupled to wheels W.

The vehicle drive device 1 further includes the friction engagement device CL capable of releasing the drivable connection between the input member I and the carrier ca. This allows the internal combustion engine E to be disconnected during execution of an electric travel mode (EV travel mode) in which output torque of the second rotary electric machine MG2 is transferred to the output member O to drive the wheels W with the internal combustion engine E stopped. This makes it possible to improve the energy efficiency by avoiding idling (dragging) of the first rotary electric machine MG1, to drive an accessory (such as an oil pump) utilizing rotation of the carrier ca, and so forth. The configuration of the vehicle drive device 1 according to the embodiment will be described in detail below.

1-1. Mechanical Configuration of Vehicle Drive Device

First, the mechanical configuration of the vehicle drive device 1 according to the embodiment will be described. The vehicle drive device 1 includes the input member I drivably coupled to the internal combustion engine E, the output member O drivably coupled to the wheels W, the first rotary electric machine MG1, the second rotary electric machine MG2, the differential gear device DG including at least three rotary elements, and the control device 70. The vehicle drive device 1 according to the embodiment is formed as a drive device for a hybrid vehicle of a so-called 2-motor split type including the differential gear device DG for power distribution which distributes output torque of the internal combustion engine E to the side of the first rotary electric machine MG1 and the side of the wheels W and the second rotary electric machine MG2.

In the embodiment, as shown in FIG. 1, the differential gear device DG is formed by the planetary gear mechanism PG of a single pinion type. That is, in the example, the differential gear device DG includes three rotary elements. The three rotary elements of the differential gear device DG are defined as a first rotary element $e1$, a second rotary element $e2$, and a third rotary element $e3$ in the order of rotational speed. Then, in the embodiment, the first rotary element e1 is formed by the sun gear s of the planetary gear mechanism PG, the second rotary element e2 is formed by the carrier ca of the planetary gear mechanism PG, and the third rotary element e3 is formed by the ring gear r of the planetary gear mechanism PG.

As discussed later, the input member I, the output member O, and the first rotary electric machine MG1 are drivably coupled to different rotary elements of the differential gear device DG via no other rotary element of the differential gear device DG. The second rotary electric machine MG2 is drivably coupled to one of the rotary elements of the differential gear device DG other than the rotary element to which the first rotary electric machine MG1 is drivably coupled, via no other rotary element of the differential gear device DG. The vehicle drive device 1 further includes the friction engagement device CL capable of releasing the drivable connection between one of the input member I, the output member O, and the first rotary electric machine MG1 and the corresponding rotary element of the differential gear device DG.

A rotary element coupling member is coupled to each of the rotary elements of the differential gear device DG to rotate together with that rotary element. Specifically, as shown in FIG. 1, a first rotary element coupling member 41 is coupled to the sun gear s serving as the first rotary element e1, a second rotary element coupling member 42 is coupled to the carrier ca serving as the second rotary element e2, and a third rotary element coupling member 43 is coupled to the ring gear r serving as the third rotary element e3. Each of the input member I, the output member O, the first rotary electric machine MG1, and the second rotary electric machine MG2 is drivably coupled to any of the rotary element coupling members to be drivably coupled to any of the rotary elements of the differential gear device DG.

The input member I is drivably coupled to the internal combustion engine E. In the embodiment, the input member I is formed by a shaft member (input shaft). The internal combustion engine E is a motor that outputs power through combustion of fuel. Examples of the internal combustion engine E include spark-ignition engines such as a gasoline engine and compression-ignition engines such as a diesel engine. The input member I is drivably coupled to an internal combustion engine output shaft such as a crankshaft of the internal combustion engine E. In the embodiment, the input member I is drivably coupled to the internal combustion engine output shaft to rotate together with the internal combustion engine output shaft so that the rotational speed of the input member I is equal to the rotational speed of the internal combustion engine E. It is also suitable that the internal combustion engine E is drivably coupled to the input member I via other devices such as a damper and a flywheel.

The output member O is drivably coupled to the wheels W. In the embodiment, the output member O is formed by a gear member, specifically a differential input gear provided in an output differential gear device D. In the example, the output differential gear device D is formed by a differential gear mechanism that uses a plurality of bevel gears that mesh with each other, and distributes torque transferred to the output member O to the left and right wheels W serving as drive wheels. The wheels W are provided with a brake device 93 (in the example, a disc brake) that applies a braking force matching the amount of operation of a brake pedal 91 (see FIG. 2) to the wheels W.

The first rotary electric machine MG1 includes a first stator St1 fixed to a case (not shown) and a first rotor Ro1 supported on the radially inner side of the first stator St1 so as to be freely rotatable. The second rotary electric machine MG2 includes a second stator St2 fixed to the case (not shown) and a second rotor Ro2 supported on the radially inner side of the second stator St2 so as to be freely rotatable. The second rotor Ro2 is drivably coupled to a second rotary electric machine output gear 55 to rotate together with the second rotary electric machine output gear 55 via a second rotor shaft to which the second rotor Ro2 is fixed.

As shown in FIG. 2, the first rotary electric machine MG1 is electrically connected to an electricity accumulation device B via a first inverter 4, and the second rotary electric machine MG2 is electrically connected to the electricity accumulation device B via a second inverter 5. Various types of electricity accumulation devices known in the art such as a battery and a capacitor may be used as the electricity accumulation device B. In the embodiment, each of the first rotary electric machine MG1 and the second rotary electric machine MG2 can function both as a motor (electric motor) that is supplied with electric power from the electricity accumulation device B to generate power (torque) and as a generator (electric generator) that is supplied with power to generate electric power and supply the generated electric power to the electricity accumulation device B.

The friction engagement device CL includes two engagement members, and selectively drivably couples a member drivably coupled to a first engagement member CLa, which is one of the two engagement members, and a member drivably coupled to a second engagement member CLb, which is the other engagement member, to each other. In the embodiment, the friction engagement device CL is formed as a wet multi-plate clutch that operates on a hydraulic pressure. In the embodiment, the friction engagement device CL is capable of releasing the drivable connection between the input member I and the corresponding rotary element (in the example, the second rotary element e2) of the differential gear device DG. That is, in the embodiment, the friction engagement device CL is provided on a power transfer path between the input member I and the corresponding rotary element (in the example, the second rotary element e2) of the differential gear device DG. The first engagement member CLa serves as an input-side engagement member drivably coupled to the input member I to rotate together with the input member I. The second engagement member CLb serves as an output-side engagement member drivably coupled to the second rotary element coupling member 42 to rotate together with the second rotary element coupling member 42. In the embodiment, the friction engagement device CL corresponds to the "engagement device" according to the present invention.

In the embodiment, as shown in FIG. 1, the first rotary electric machine MG1 is drivably coupled to the sun gear s (first rotary element e1), the input member I is drivably coupled to the carrier ca (second rotary element e2), and the second rotary electric machine MG2 and the output member O are drivably coupled to the ring gear r (third rotary element e3), via no other rotary element of the planetary gear mechanism PG (differential gear device DG). That is, in the embodiment, the second rotary electric machine MG2 is drivably coupled to the ring gear r (third rotary element e3), which is the rotary element of the differential gear device DG to which the output member O is drivably coupled, via no other rotary element of the differential gear device DG.

Specifically, a first rotor shaft to which the first rotor Ro1 is fixed is drivably coupled to the first rotary element coupling member 41 to rotate together with the first rotary element coupling member 41 so that the first rotary electric machine MG1 is drivably coupled to the sun gear s. That is, in the embodiment, the rotational speed of the sun gear s (first rotary element e1) is equal to the rotational speed of the first rotor Ro1 (first rotary electric machine MG1) at all times.

The input member I is drivably coupled to the first engagement member CLa of the friction engagement device CL to rotate together with the first engagement member CLa in order to be selectively drivably coupled to the carrier ea via the friction engagement device CL. That is, in the embodiment, in the case where the friction engagement device CL is in a directly engaged state, the rotational speed of the carrier ca (second rotary element e2) is equal to the rotational speed of the input member I (internal combustion engine E). In the embodiment, in addition, the difference in rotational speed between the two engagement members of the friction engagement device CL is the difference between the rotational speed of the input member I (internal combustion engine E) and the rotational speed of the carrier ca (second rotary element coupling member 42).

The second rotary electric machine MG2 and the output member O are drivably coupled to the ring gear r via a counter gear mechanism C. As shown in FIG. 1, the counter gear mechanism C is formed to include a first counter gear 53, a second counter gear 54, and a counter shaft that couples the first counter gear 53 and the second counter gear 54 so that the first counter gear 53 and the second counter gear 54 rotate together. The third rotary element coupling member 43 includes a counter drive gear 52 that meshes with the first counter gear 53. The second rotary electric machine MG2 is drivably coupled to the ring gear r with the second rotary electric machine output gear 55 disposed to mesh with the first counter gear 53 at a position that is different in the circumferential direction (in the circumferential direction of the first counter gear 53) from the counter drive gear 52. The output member O is disposed to mesh with the second counter gear 54 to be drivably coupled to the ring gear r. That is, in the embodiment, the respective rotational speeds of the ring gear r, the second rotary electric machine MG2, and the output member O are proportional to each other, and the proportionality coefficient (that is, the ratio in rotational speed) is determined in accordance with the number of teeth of gears interposed therebetween.

The vehicle drive device 1 configured as described above can execute a hybrid travel mode (split travel mode) in which the vehicle is run using output torque of both the internal combustion engine E and the rotary electric machines MG1 and MG2 and an electric travel mode (EV travel mode) in which the vehicle is run using only output torque of the rotary electric machines MG1 and MG2 (in the example, only output torque of the second rotary electric machine MG2). In the hybrid travel mode, the friction engagement device CL is brought into the directly engaged state, and the planetary gear mechanism PG distributes output torque of the internal combustion engine E to the sun gear s (first rotary electric machine MG1) and the ring gear r (counter drive gear 52). In the EV travel mode, the friction engagement device CL is brought into a disengaged state, and the internal combustion engine E is stopped. In addition, the rotational speed of the internal combustion engine output shaft (input member I) basically becomes zero because of a fiction force produced inside the internal combustion engine E, and the rotational speed of the first rotary electric machine MG1 is basically controlled to zero.

1-2. System Configuration of Vehicle Drive Device
1-2-1. Overall Configuration of System As shown in FIG. 2, the control device 70 according to the embodiment includes a rotary electric machine control section 71, a travel mode decision section 73, a rotational direction determination section 81, a rotation reducing torque control section 82, and a connection release command section 83.

The control device 70 includes an arithmetic processing unit such as a CPU serving as a core, a storage device such as a RAM and a ROM, and so forth. The various functional sections of the control device 70 are formed by software (a program) stored in the ROM or the like, hardware such as a separately provided arithmetic circuit, or a combination of both. The functional sections are configured to exchange information between each other.

The control device 70 is configured to acquire information from sensors or the like provided in various portions of the vehicle incorporating the vehicle drive device 1 in order to acquire information on the various portions of the vehicle. Specifically, as shown in FIG. 2, the control device 70 is configured to acquire information from an input member sensor Se1, an output member sensor Se3, an accelerator operation amount sensor Se11, a brake operation sensor Se12, a first rotor shaft sensor Se2, a rotary element-to-be-released sensor Se4, and an electricity accumulation state sensor Se10.

The input member sensor Se1 detects the rotational speed of the input member I. In the example, the rotational speed of the input member I detected by the input member sensor Se1 is equal to the rotational speed of the internal combustion engine E. The output member sensor Se3 detects the rotational speed of the output member O. In the example, the rotational speed of the output member O is proportional to the rotational speed of the second rotary electric machine MG2. Therefore, the rotational speed of the output member O may be acquired on the basis of the results of detection performed by a rotation sensor (such as a resolver) provided in the second rotary electric machine MG2. The control device 70 derives the vehicle speed on the basis of the rotational speed of the output member O detected by the output member sensor Se3. The accelerator operation amount sensor Se11 detects the amount of operation of an accelerator pedal 90 to detect the accelerator operation amount. The electricity accumulation state sensor Se10 detects the state (such as accumulated electricity amount and temperature) of the electricity accumulation device B.

The brake operation sensor Se12 detects the amount of operation of the brake pedal 91. The vehicle includes a brake device control unit 8 that controls operation of the brake device 93 (see FIG. 1). The control device 70 controls the brake device control unit 8 such that a braking force matching the amount of operation of the brake pedal 91 is applied to the wheels W on the basis of the results of detection performed by the brake operation sensor Se12.

The first rotor shaft sensor Se2 detects the rotational speed of the first rotary electric machine MG1 (first rotor shaft). In the example, the rotational speed of the first rotary electric machine MG1 detected by the first rotor shaft sensor Se2 is equal to the rotational speed of the first rotary element coupling member 41 (sun gear s). The first rotor shaft sensor Se2 may be formed by a rotation sensor (such as a resolver) provided in the first rotary electric machine MG1, for example.

The rotary element-to-be-released sensor Se4 detects the rotational speed of a rotary element to be released en among the rotary elements of the differential gear device DG. The rotary element to be released en is the rotary element for which the friction engagement device CL is capable of releasing drivable connection with the corresponding one of the input member I, the output member O, and the first rotary electric machine MG1. In the embodiment, the carrier ca serves as the rotary element to be released en, and the rotary element-to-be-released sensor Se4 detects the rotational speed of the second rotary element coupling member 42.

As shown in FIG. 2, the vehicle includes an internal combustion engine control unit 3. The internal combustion engine control unit 3 controls various portions of the internal combustion engine E to control operation of the internal combustion engine E. Specifically, the internal combustion engine control unit 3 controls operation of the internal combustion engine E by setting target operation points (target torque and target rotational speed) serving as control targets for operation points (output torque and rotational speed) of the internal combustion engine E and causing the internal combustion engine E to operate in accordance with the control targets. The target torque and the target rotational speed are set on the basis of a command from the control device 70. In the case where a command to start the internal combustion engine E is received from the control device 70 when the internal combustion engine E is stopped, the internal combustion engine control unit 3 starts fuel injection and ignition to start the internal combustion engine E. In the case where a command to stop the internal combustion engine E is received from the control device 70 after the internal combustion engine E is started (when the internal combustion engine E is in operation), the internal combustion engine control unit 3 stops fuel injection and ignition to stop the internal combustion engine E.

As shown in FIG. 2, the vehicle also includes a friction engagement device control unit 6 that controls operation of the friction engagement device CL. In the embodiment, the friction engagement device CL operates on a hydraulic pressure, and the friction engagement device control unit 6 controls operation of the friction engagement device CL by controlling a hydraulic pressure control device 2. Specifically, the friction engagement device control unit 6 generates a hydraulic pressure command value for the friction engagement device CL, and controls the hydraulic pressure control device 2 such that a hydraulic pressure corresponding to the hydraulic pressure command value is supplied to the friction engagement device CL.

The state of the friction engagement device CL includes a "coupled state" in which the drivable connection made by the friction engagement device CL is maintained and a "decoupled state" in which the drivable connection made by the friction engagement device CL is released. That is, in the "coupled state", torque is transferred via the friction engagement device CL, and the drivable connection made by the friction engagement device CL is enabled. In the "decoupled state", meanwhile, torque is not transferred via the friction engagement device CL, and the drivable connection made by the friction engagement device CL is disabled.

In the embodiment, the state of the friction engagement device CL is switched between the coupled state and the decoupled state in accordance with the state of engagement between the two engagement members provided in the friction engagement device CL. That is, the friction engagement device CL is brought into the decoupled state in the case where the state of engagement between the two engagement members is a "disengaged state", and the friction engagement device CL is brought into the coupled state in the case where the state of engagement between the two engagement members is a "slip engagement state" or a "directly engaged state".

The "disengaged state" is a state (engagement released state) in which rotation and torque are not transferred between the two engagement members of the friction engagement device CL. The "slip engagement state" is a state (engaged state) in which the two engagement members are engaged with each other with a difference in rotational speed therebetween. The "directly engaged state" is a state (engaged state) in which the two engagement members rotate together. That is, the "slip engagement state" is an engaged state in which torque is transferred between the two engagement members of the friction engagement device CL with the two engagement members rotatable relative to each other. Meanwhile, the "directly engaged state" is an engaged state in which the two engagement members of the friction engagement device CL are directly coupled to each other so that there is no difference in rotation between the two engagement members. Thus, the engaged state includes the slip engagement state and the directly engaged state. The directly engaged state includes a "steady directly engaged state" in which the directly engaged state is maintained regardless of fluctuations in torque transferred by the friction engagement device CL. Such a steady directly engaged state is obtained at a line pressure (reference hydraulic pressure) generated by the hydraulic pressure control device 2, for example. In the following description, the state of the friction engagement device CL is represented in relation to the state of engagement between the two engagement members.

The magnitude of torque that can be transferred between the two engagement members of the friction engagement device CL is decided in accordance with the engagement pressure of the friction engagement device CL at that time point. The magnitude of torque at this time is defined as the transfer torque capacity of the friction engagement device CL. In the embodiment, increase and decrease in transfer torque capacity of the friction engagement device CL can be continuously controlled by continuously controlling the magnitudes of the amount of oil and the hydraulic pressure to be supplied to the friction engagement device CL through a proportional solenoid valve in accordance with the hydraulic pressure command value for the friction engagement device CL. In the embodiment, the friction engagement device control unit 6 controls the state of the friction engagement device CL by controlling the transfer torque capacity of the friction engagement device CL on the basis of an engagement command, an engagement release command (disengagement command), and so forth from the control device 70.

1-2-2. Configuration of Travel Mode Decision Section

The travel mode decision section 73 is a functional section that decides a travel mode of the vehicle. The travel mode decision section 73 decides the travel mode to be established by the vehicle drive device 1 on the basis of the vehicle speed derived on the basis of the results of detection performed by the output member sensor Se3, the accelerator operation amount detected by the accelerator operation amount sensor Se11, and the electricity accumulation state (such as accumulated electricity amount and temperature) detected by the electricity accumulation state sensor Se10, for example. In the embodiment, examples of the travel mode that can be decided by the travel mode decision section 73 include the electric travel mode and the hybrid travel mode. The travel mode decision section 73 basically references a mode selection map (not shown) stored in a storage device formed by a memory or the like and defining the relationship between the vehicle speed, the accelerator operation amount, and the electricity accumulation state and the travel mode to decide the travel mode.

According to the mode selection map, it is decided to transition into the electric travel mode in the case where internal combustion engine stop conditions are established during travel in the hybrid travel mode. The internal combustion engine stop conditions are conditions for stopping the internal combustion engine E which has been started (in operation), and are established in the case where the vehicle does not need torque of the internal combustion engine E any more and in the case where the vehicle cannot utilize torque of the internal combustion engine E. For example, the internal combustion engine stop conditions are established in the case where torque required by the vehicle can be obtained with only the rotary electric machines MG1 and MG2 during travel in the hybrid travel mode because the amount of depression of the accelerator pedal 90 is decreased, the amount of depression of the brake pedal 91 is increased, or the like. The internal combustion engine stop conditions are also established in the case where it is no longer necessary that the rotary electric machines MG1 and MG2 should generate electricity using torque of the internal combustion engine E to charge the electricity accumulation device B because the amount of electricity accumulated in the electricity accumulation device B has recovered to a threshold determined in advance or more.

1-2-3. Configuration of Rotary Electric Machine Control Section

The rotary electric machine control section 71 is a functional section that controls operation of the first rotary electric machine MG1 and the second rotary electric machine MG2. Specifically, the rotary electric machine control section 71 sets target operation points (target torque and target rotational speed) serving as control targets for operation points (output torque and rotational speed) of the first rotary electric machine MG1, and controls the first inverter 4 such that the first rotary electric machine MG1 operates in accordance with the control targets. In the example, the rotary electric machine control section 71 controls operation of the first rotary electric machine MG1 through torque control or rotational speed control. In the torque control, target torque for the first rotary electric machine MG1 is set to match output torque of the first rotary electric machine MG1 with the target torque. In the rotational speed control, meanwhile, a target rotational speed for the first rotary electric machine MG1 is set to match the rotational speed of the first rotary electric machine MG1 with the target rotational speed. Control for the second rotary electric machine MG2 is the same as the control for the first rotary electric machine MG1 except that the first inverter 4 is replaced with the second inverter 5.

In the embodiment, the torque control described above includes rotation reducing torque control in which the first rotary electric machine MG1 is caused to output rotation reducing torque. The rotation reducing torque control is executed by the rotation reducing torque control section 82. The configuration of the rotation reducing torque control section 82 will be described later in "1-2-5. Configuration of Rotation Reducing Torque Control Section".

1-2-4. Configuration of Rotational Direction Determination Section

The rotational direction determination section 81 is a functional section that executes rotational direction determination when the internal combustion engine stop conditions for stopping the internal combustion engine E are established in a state in which the drivable connection made by the friction engagement device CL is maintained, the internal combustion engine E is in operation, and the output member O is rotating. That is, the rotational direction determination section 81 executes rotational direction determination when the internal combustion engine stop conditions are established during travel with the friction engagement device CL in the engaged state (basically the directly engaged state) and with the internal combustion engine E started (during travel in the hybrid travel mode). The determination as to whether or not the internal combustion engine stop conditions are established is executed by the control device 70.

In the "rotational direction determination", it is determined whether or not the rotational direction of the first rotary electric machine MG1 at the time when the internal combustion engine stop conditions are established (hereinafter referred to as "stop condition establishing rotational direction K1") is opposite to the rotational direction of the first rotary electric machine MG1 at an operation point at which the rotational speed of the internal combustion engine E becomes zero (hereinafter referred to as "subject rotational direction K2").

Figure 3:
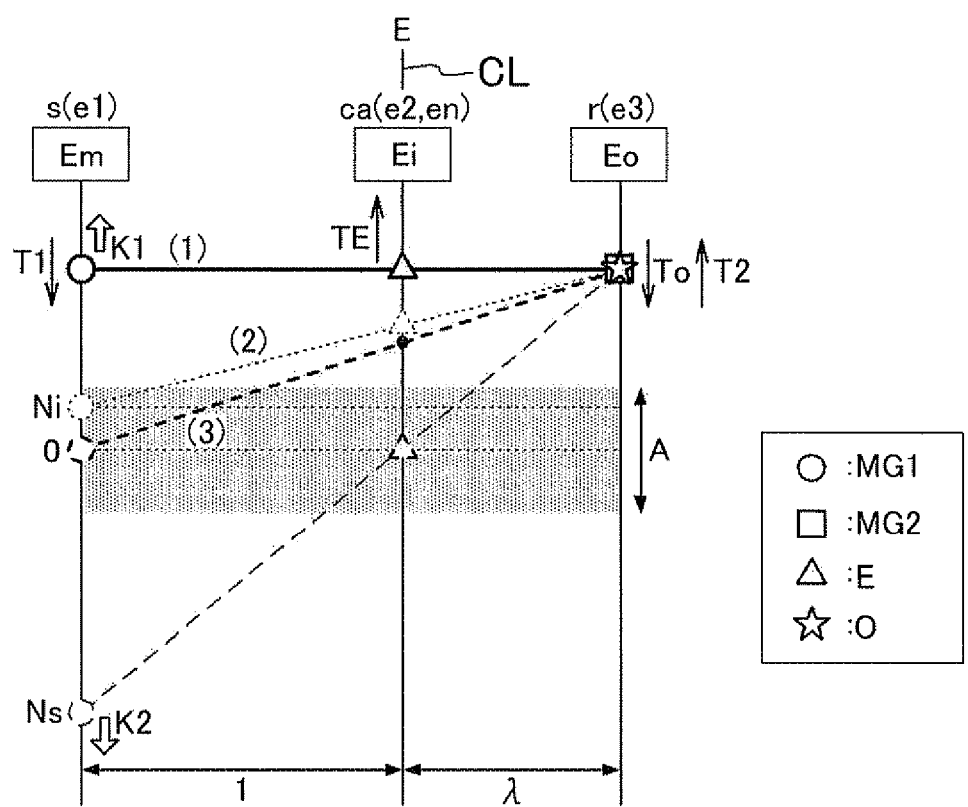
FIG. 3 is a velocity diagram illustrating operation of internal combustion engine stop control according to the first embodiment of the present invention.

The rotational direction determination executed by the rotational direction determination section 81 will be described with reference to FIG. 3. FIG. 3 is a velocity diagram representing the state of operation of the differential gear device DG (in the example, the planetary gear mechanism PG). In the velocity diagram, the vertical axis corresponds to the rotational speed of each rotary element. That is, the indication "0" provided on the vertical axis indicates that the rotational speed is zero, with the upper side corresponding to positive rotation (the rotational speed is positive) and the lower side corresponding to negative rotation (the rotational speed is negative). The term "positive direction" as used for the direction of rotation (rotational speed) and torque of each member indicates the same direction as the rotational direction of the internal combustion engine E during operation of the internal combustion engine E. The term "negative direction" indicates the opposite direction.

A plurality of vertical lines disposed in parallel correspond to the respective rotary elements of the differential gear device DG. The intervals between the vertical lines corresponding to the respective rotary elements correspond to a gear ratio $\lambda$ of the differential gear device DG. In the example, the differential gear device DG is formed by the planetary gear mechanism PG, and the gear ratio $\lambda$. is the ratio in number of teeth between the sun gear s and the ring gear r. The reference symbols "Em", "Ei", and "Eo" enclosed in boxes provided above the vertical lines indicate a reaction force transfer element Em, an input rotary element Ei, and an output rotary element Eo, respectively, for execution of the hybrid travel mode. The first rotary electric machine MG1, the internal combustion engine E (input member I), and the output member O are drivably coupled to the reaction force transfer element Em, the input rotary element Ei, and the output rotary element Eo, respectively, via no other rotary element of the differential gear device DG. That is, the reaction force transfer element Em, the input rotary element Ei, and the output rotary element Eo are a first rotary electric machine coupling element, an input member coupling element (internal combustion engine coupling element), and an output member coupling element, respectively.

In the velocity diagram, the rotational speed of the first rotary electric machine MG1, the rotational speed of the second rotary electric machine MG2, the rotational speed of the internal combustion engine E (input member I), and the rotational speed of the output shaft O are indicated by symbols that are different from each other. Specifically, the "circular" symbols indicate the rotational speed of the first rotary electric machine MG1, the "square" symbol indicates the rotational speed of the second rotary electric machine MG2, the "triangular" symbols indicate the rotational speed of the internal combustion engine E, and the "star" symbol indicates the rotational speed of the output member O. In order to facilitate understanding of the present invention, the rotational speed of each of the first rotary electric machine MG1, the second rotary electric machine MG2, the internal combustion engine E, and the output member O represents a rotational speed after conversion (speed change) of rotational speed performed by transmission members (excluding an engagement element that selectively transfers rotation and torque such as the friction engagement device CL) provided on the power transfer path to the corresponding rotary element (rotary element coupling member) of the differential gear device DG. Also in the following description, the rotational speed of each member basically means a rotational speed after conversion of rotational speed performed by the transmission members.

Specifically, in the embodiment, the first rotary electric machine MG1 is drivably coupled to the first rotary element coupling member 41 to rotate together with the first rotary element coupling member 41. Therefore, the rotational speed of the first rotary electric machine MG1 (sun gear s) in the velocity diagram coincides with the actual rotational speed of the first rotary electric machine MG1. In the case where the friction engagement device CL is in the directly engaged state, the internal combustion engine E (input member I) rotates at the same rotational speed as the second rotary element coupling member 42. Therefore, the rotational speed of the internal combustion engine E (carrier ca) in the velocity diagram coincides with the actual rotational speed of the internal combustion engine E.

Meanwhile, the second rotary electric machine MG2 is drivably coupled to the third rotary element coupling member 43 via the counter gear mechanism C. Therefore, the rotational speed of the second rotary electric machine MG2 (ring gear r) in the velocity diagram is obtained by multiplying the actual rotational speed of the second rotary electric machine MG2 by the gear ratio of a power transfer system formed by the second rotary electric machine output gear 55, the first counter gear 53, and the counter drive gear 52. Likewise, the output member O is drivably coupled to the third rotary element coupling member 43 via the counter gear mechanism C. Therefore, the rotational speed of the output member O in the velocity diagram is obtained by multiplying the actual rotational speed of the output member O by the gear ratio of a power transfer system formed by the differential input gear (output member O), the second counter gear 54, the first counter gear 53, and the counter drive gear 52.

"T1" indicates torque (first rotary electric machine torque) transferred from the first rotary electric machine MG1 to the corresponding rotary element (reaction force transfer element Em; in the example, the sun gear s) of the differential gear device DG. "T2" indicates torque (second rotary electric machine torque) transferred from the second rotary electric machine MG2 to the corresponding rotary element (in the example, the ring gear r) of the differential gear device DG. "TE" indicates torque (internal combustion engine torque) transferred from the internal combustion engine E to the corresponding rotary element (input rotary element Ei; in the example, the carrier ca) of the differential gear device DG. "To" indicates torque (travel torque, travel resistance) transferred from the output member O (wheels W) to the corresponding rotary element (output rotary element Eo; in the example, the ring gear r) of the differential gear device DG. An arrow provided adjacent to each torque represents the direction of each torque applied during execution of the hybrid travel mode. An arrow pointing upward represents torque in the positive direction. An arrow pointing downward represents torque in the negative direction. Each velocity diagram to be referenced below also indicates the state of operation of the differential gear device DG as with FIG. 3.

The state indicated by the thick solid line in FIG. 3 (the state indicated by "(1)") represents a state of operation in the hybrid travel mode. In the hybrid travel mode, the friction engagement device CL is brought into the engaged state (basically the directly engaged state). In the hybrid travel mode, the internal combustion engine E outputs torque in the positive direction matching the required drive force for driving the vehicle while being controlled so as to be maintained in a state with high efficiency and low gas emission (a state according to optimum fuel consumption characteristics), and the first rotary electric machine MG1 functions to receive a reaction force of torque of the internal combustion engine E by outputting torque in the negative direction. In this event, the first rotary electric machine MG1 basically rotates positively to generate electricity. Meanwhile, the second rotary electric machine MG2 basically outputs torque in the positive direction to supplement torque to be transferred to the output member O. In the embodiment, the output member O basically rotates in the positive direction as with the internal combustion engine E during execution of the hybrid travel mode.

In the case where the internal combustion engine stop conditions are established in the state indicated by the thick solid line in FIG. 3, the rotational direction determination section 81 executes the rotational direction determination. In the example shown in FIG. 3, the operation point of the first rotary electric machine MG1 at the time when the internal combustion engine stop conditions are established is indicated by the thick solid circle in FIG. 3. Therefore, the stop condition establishing rotational direction K1 is the "positive direction". The stop condition establishing rotational direction K1 is acquired on the basis of the results of detection performed by the first rotor shaft sensor Se2, for example. The rotational speed of the first rotary electric machine MG1 (the rotational speed of the sun gear s) is uniquely determined in accordance with the rotational speed of the carrier ca and the rotational speed of the ring gear r. Therefore, the stop condition establishing rotational direction K1 may be derived on the basis of the respective detected rotational speeds of the carrier ca and the ring gear r.

In the example shown in FIG. 3, the operation point of the first rotary electric machine MG1 at which the rotational speed of the internal combustion engine E becomes zero with the friction engagement device CL in the directly engaged state is indicated by the thin broken circle in FIG. 3, at which the rotational speed is a subject rotational speed Ns. Therefore, the subject rotational direction K2 is the "negative direction". Hence, in the example shown in FIG. 3, it is determined that the stop condition establishing rotational direction K1 is opposite to the subject rotational direction K2. Although not shown, the stop condition establishing rotational direction K1 may be in the "negative direction" depending on the rotational speed of the internal combustion engine E and the rotational speed of the output member O. In this case, it is determined that the stop condition establishing rotational direction K1 is the same as the subject rotational direction K2. In each of the drawings (FIGS. 7 and 9 to 15) to be referenced later in relation to other embodiments, a case where the stop condition establishing rotational direction K1 is opposite to the subject rotational direction K2 is shown as the state during execution of the hybrid travel mode (the state indicated by the thick solid line).

The relationship between the subject rotational direction K2 and the rotational direction of the output member O is determined in accordance with the order of the respective rotational speeds of the reaction force transfer element Em, the input rotary element Ei, and the output rotary element Eo. That is, in the case where the rotational speed of the input rotary element Ei comes between the respective rotational speeds of the other two of the three rotary elements as in the coupling relationship shown in FIG. 3, for example, the subject rotational direction K2 is opposite to the rotational direction of the output member O. In the case where the rotational speed of the input rotary element Ei does not come between the respective rotational speeds of the other two of the three rotary elements as in the coupling relationship shown in FIG. 10 to be referenced later, for example, the subject rotational direction K2 is the same as the rotational direction of the output member O.

In the embodiment, the order of the respective rotational speeds of the reaction force transfer element Em, the input rotary element Ei, and the output rotary element Eo is determined such that the rotational speed of the input rotary element Ei comes between the respective rotational speeds of the other two. Therefore, the subject rotational direction K2 is opposite to the rotational direction of the output member O. In the embodiment, as described above, the output member O basically rotates in the positive direction as with the internal combustion engine E during execution of the hybrid travel mode. Therefore, in the embodiment, the subject rotational direction K2 is basically the negative direction. Hence, in the embodiment, it is determined in the rotational direction determination made by the rotational direction determination section 81 that the stop condition establishing rotational direction K1 is opposite to the subject rotational direction K2 in the case where the stop condition establishing rotational direction K1 is the positive direction, and that the stop condition establishing rotational direction K1 is the same as the subject rotational direction K2 in the case where the stop condition establishing rotational direction K1 is the negative direction.

1-2-5. Configuration of Rotation Reducing Torque Control Section

The rotation reducing torque control section 82 is a functional section that executes the rotation reducing torque control in which the first rotary electric machine MG1 is caused to output rotation reducing torque in the direction to reduce the rotational speed of the internal combustion engine E on condition that the rotational direction determination section 81 determines that the stop condition establishing rotational direction K1 is opposite to the subject rotational direction K2. The state indicated by the thin spaced broken line (thin dotted line) in FIG. 3 (the state indicated by "(2)") represents a state in which the rotational speed of the internal combustion engine E is reduced compared to that during travel in the hybrid travel mode through execution of the rotation reducing torque control.

In the embodiment, a command for the internal combustion engine control unit 3 to stop the internal combustion engine E is immediately executed when the internal combustion engine stop conditions are established. The rotation reducing torque control section 82 basically starts the rotation reducing torque control with at least one (in the example, both) of fuel injection and ignition of the internal combustion engine E stopped. Immediately after fuel injection and ignition of the internal combustion engine E are stopped, the internal combustion engine output shaft of the internal combustion engine E is subjected to inertial torque matching the moment of inertia of the internal combustion engine E in the direction to continuously rotate (positive direction). During execution of the rotation reducing torque control, the first rotary electric machine MG1 is controlled so as to output the rotation reducing torque which is torque for reducing the rotational speed of the internal combustion engine E against the inertial torque. To "reduce" a rotational speed means to vary the rotational speed in the negative direction, and to "increase" a rotational speed means to vary the rotational speed in the positive direction.

During execution of the hybrid travel mode, the first rotary electric machine MG1 functions to receive a reaction force of the internal combustion engine E. To this end, the first rotary electric machine MG1 outputs torque in the direction to reduce the rotational speed of the internal combustion engine E. Therefore, the direction of the rotation reducing torque output from the first rotary electric machine MG1 during execution of the rotation reducing torque control coincides with the direction of output torque of the first rotary electric machine MG1 during execution of the hybrid travel mode. The direction of output torque of the first rotary electric machine MG1 during execution of the hybrid travel mode is determined in accordance with the order of the respective rotational speeds of the reaction force transfer element Em, the input rotary element Ei, and the output rotary element Eo. That is, in the case where the rotational speed of the output rotary element Eo does not come between the respective rotational speeds of the other two of the three rotary elements, the direction of the output torque is the negative direction. In the case where the rotational speed of the output rotary element Eo comes between the respective rotational speeds of the other two of the three rotary elements, meanwhile, the direction of the output torque is the positive direction.

In the embodiment, the order of the respective rotational speeds of the reaction force transfer element Em, the input rotary element Ei, and the output rotary element Eo is determined such that the rotational speed of the output rotary element Eo does not come between the respective rotational speeds of the other two, and therefore the direction of the rotation reducing torque is the negative direction. Therefore, the first rotary electric machine MG1 is controlled so as to output torque in the negative direction (rotation reducing torque) so that the rotational speed of the first rotary electric machine MG1 is reduced during execution of the rotation reducing torque control, which reduces the rotational speed of the first rotary electric machine MG1 and the rotational speed of the internal combustion engine E.

In the embodiment, as described above, in the case where the stop condition establishing rotational direction K1 is the positive direction, the rotational direction determination section 81 determines that the stop condition establishing rotational direction K1 is opposite to the subject rotational direction K2. Therefore, at the start of execution of the rotation reducing torque control, execution of which is started on condition of such a determination, the direction of the rotation reducing torque is opposite to the rotational direction of the first rotary electric machine MG1 (that is, in the direction to generate electricity). Hence, execution of the rotation reducing torque control enables the first rotary electric machine MG1 to regenerate (generate) electric power matching the magnitude of the inertial torque of the internal combustion engine E during a period until the rotational speed of the first rotary electric machine MG1 becomes zero.

In the embodiment, the rotation reducing torque control is stopped before the rotational direction of the first rotary electric machine MG1 becomes the same as the subject rotational direction K2. In the example, the subject rotational direction K2 is the negative direction, and therefore the rotation reducing torque control is stopped before the rotational speed of the first rotary electric machine MG1 becomes negative, that is, with the rotational speed of the first rotary electric machine MG1 equal to or more than zero.

The rotation reducing torque may be set in accordance with the target rate of variation in rotational speed of the internal combustion engine E, the moment of inertia of the internal combustion engine E, the gear ratio λ of the differential gear device DG, and so forth during execution of the rotation reducing torque control. Specifically, the magnitude of the rotation reducing torque output from the first rotary electric machine MG1 is set such that the carrier ca is subjected to torque with a magnitude matching the product of the target rate of variation in rotational speed of the internal combustion engine E and the moment of inertia of the internal combustion engine E. The rotation reducing torque may be a fixed value set in advance, or may be set to be variable in accordance with the state of operation during execution of the hybrid travel mode. In this event, the rotation reducing torque may be set to become larger as the rotational speed of the internal combustion engine E becomes higher during execution of the hybrid travel mode, for example.

In the embodiment, the rotary electric machine control section 71 is configured to execute fluctuation suppressing control at least during a period since the internal combustion engine stop conditions are established until the drivable connection made by the friction engagement device CL is released. In the fluctuation suppressing control, the second rotary electric machine MG2 is caused to output fluctuation suppressing torque for suppressing torque fluctuations to be transferred to the output member O via the differential gear device DG because of variations in state of operation (such as rotational speed and output torque) of the first rotary electric machine MG1 and variations in state of engagement of the friction engagement device CL. The fluctuation suppressing torque will be derived by a fluctuation suppressing torque derivation section 84 to be described later in "1-2-7. Configuration of Fluctuation Suppressing Torque Derivation Section".

1-2-6. Configuration of Connection Release Command Section

The connection release command section 83 is a functional section that issues a command to release the drivable connection made by the friction engagement device CL on condition that the rotational speed of the first rotary electric machine MG1 falls within a connection release rotational speed range A. In the embodiment, the drivable connection made by the friction engagement device CL is released by releasing engagement between the two engagement members of the friction engagement device CL. Hence, in the embodiment, the connection release command section 83 issues a command to release engagement of the friction engagement device CL on condition that the rotational speed of the first rotary electric machine MG1 falls within the connection release rotational speed range A.

The connection release rotational speed range A is set so as to include zero. The connection release rotational speed range A is set in consideration of the control responsiveness of the first rotary electric machine MG1, for example. The magnitude of the connection release rotational speed range A is selected from a range of 50 rpm or more and 500 rpm or less, for example. In the embodiment, as shown in FIG. 3, the connection release rotational speed range A is set so as to include a rotational speed range in which the rotational speed is positive, and the connection release command section 83 issues a command to release engagement of the friction engagement device CL on condition that the rotational speed of the first rotary electric machine MG1 becomes a rotational speed (connection release rotational speed Ni) that is equal to or more than zero and that is included in the connection release rotational speed range A. Thus, in the embodiment, the engagement release command issued by the connection release command section 83 is executed before the rotational direction of the first rotary electric machine MG1 becomes the same as the subject rotational direction K2.

In the example shown in FIG. 3, the connection release rotational speed range A is set so as to include a rotational speed range in which the rotational speed is negative. However, the connection release rotational speed range A may be set so as to include only a rotational speed range in which the rotational speed is positive in addition to zero. In the case where the connection release rotational speed range A is set so as to include both a rotational speed range in which the rotational speed is positive and a rotational speed range in which the rotational speed is negative in addition to zero, the connection release rotational speed range A may be set so as to include equal positive and negative rotational speed ranges as in the example shown in FIG. 3, or may be set so as to include non-equal positive and negative rotational speed ranges.

The state indicated by the thin spaced broken line (thin dotted line) in FIG. 3 (the state indicated by "(2)") represents a state in which the rotational speed of the first rotary electric machine MG1 becomes the connection release rotational speed Ni. In the example, the connection release rotational speed Ni is higher than zero. In this state, the connection release command section 83 issues a command to release engagement of the friction engagement device CL. In the embodiment, further, the rotation reducing torque control is stopped on condition that the rotational speed of the first rotary electric machine MG1 becomes the connection release rotational speed Ni. That is, in the embodiment, the rotational speed of the first rotary electric machine MG1 at which the rotation reducing torque control is stopped is equal to the rotational speed of the first rotary electric machine MG1 at which the connection release command section 83 issues a command to release engagement of the friction engagement device CL.

When the connection release command section 83 issues a command to release engagement of the friction engagement device CL, the friction engagement device control unit 6 performs control so as to reduce the transfer torque capacity of the friction engagement device CL at a predetermined (for example, constant) variation rate from the current value (for example, such a value that brings the friction engagement device CL into the steady directly engaged state) to zero. This brings the friction engagement device CL into the disengaged state.

When the friction engagement device CL is brought into the disengaged state, the rotational speed of the internal combustion engine E is varied toward zero at a variation rate matching the moment of inertia of the internal combustion engine E; the frictional resistance due to sliding parts, bearings, and so forth forming the internal combustion engine E; and so forth. The rotational speed of the internal combustion engine E becomes zero after a predetermined time elapses. In the embodiment, the first rotary electric machine MG1 is controlled (for example, subjected to rotational speed feedback control) such that the rotational speed of the first rotary electric machine MG1 becomes zero after the rotation reducing torque control is stopped, and the rotational speed of the first rotary electric machine MG1 becomes zero after a predetermined time elapses.

The state indicated by the thick broken line in FIG. 3 (the state indicated by "(3)") represents a state of operation in which the vehicle is traveling in the electric travel mode with the friction engagement device CL in the disengaged state and with both the respective rotational speeds of the internal combustion engine E and the first rotary electric machine MG1 brought to zero. In the electric travel mode, the friction engagement device CL is in the disengaged state, and therefore the rotary element to be released en of the differential gear device DG is freely rotatable independently of the internal combustion engine E. In the embodiment, the carrier ca serves as the rotary element to be released en, and rotates at a rotational speed determined on the basis of the vehicle speed (the rotational speed of the output member O) and the rotational speed of the first rotary electric machine MG1.

1-2-7. Configuration of Fluctuation Suppressing Torque Derivation Section

The fluctuation suppressing torque derivation section 84 is a functional section that derives the fluctuation suppressing torque that the second rotary electric machine MG2 is caused to output during execution of the fluctuation suppressing control. As described above, fluctuation suppressing control is executed at least during a period since the internal combustion engine stop conditions are established until the drivable connection made by the friction engagement device CL is released.

In the case where the friction engagement device CL is in the slip engagement state or the directly engaged state, torque fluctuations are transferred to the output member O via the differential gear device DG because of variations in state of operation (such as rotational speed and output torque) of the first rotary electric machine MG1. Torque fluctuations are also transferred to the output member O via the differential gear device DG because of variations in state of engagement of the friction engagement device CL. The fluctuation suppressing torque is torque for suppressing such torque fluctuations. The direction of the fluctuation suppressing torque is the direction to cancel the torque fluctuations. The magnitude of the fluctuation suppressing torque is set on the basis of the magnitude of the torque fluctuations. The rotary electric machine control section 71 controls operation of the second rotary electric machine MG2 by setting the target torque for the second rotary electric machine MG2 to torque obtained by adding the fluctuation suppressing torque to second rotary electric machine required torque (torque required for the second rotary electric machine MG2) determined in accordance with vehicle required torque.

1-3. Content of Internal Combustion Engine Stop Control

Figure 4:
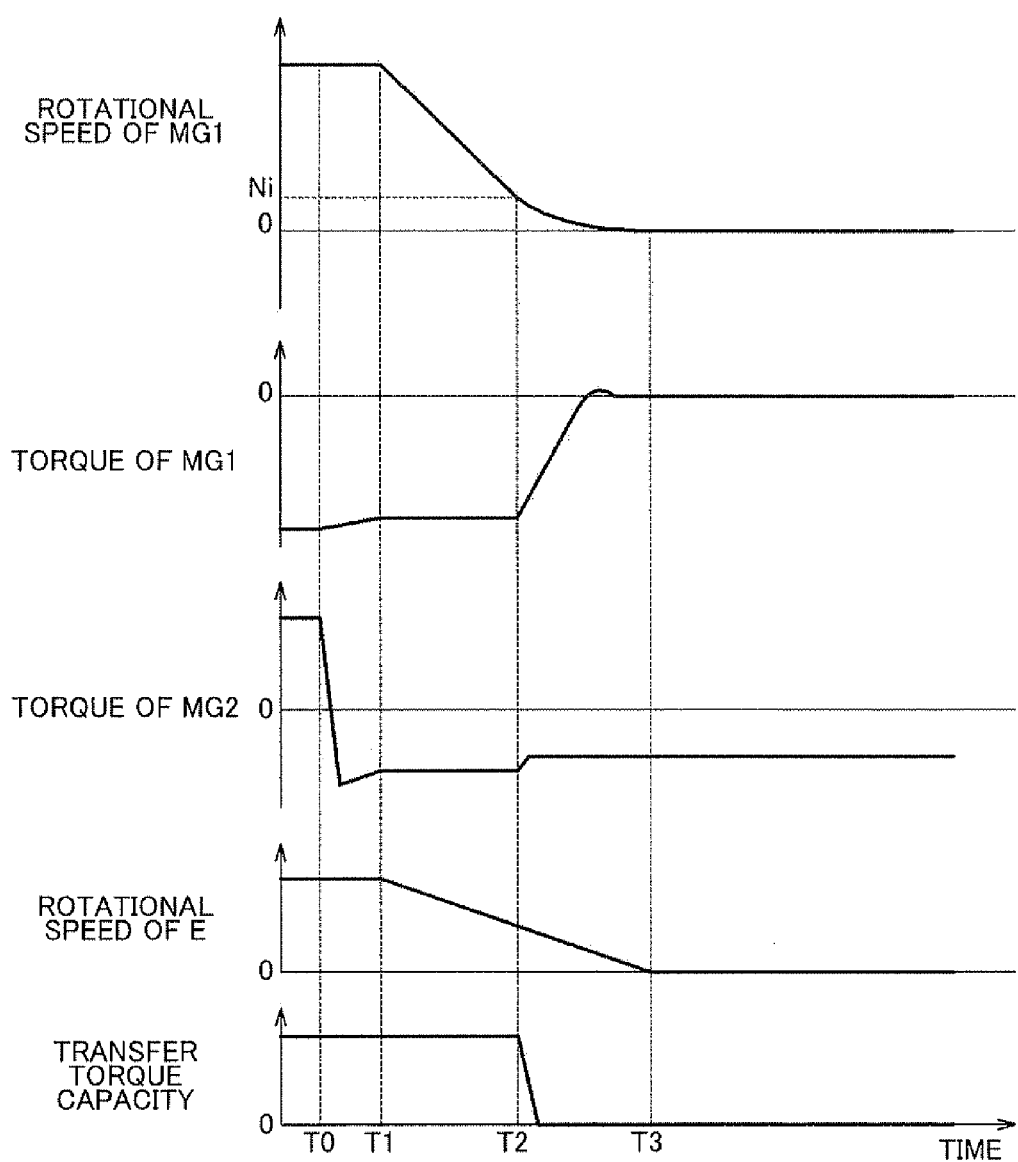
FIG. 4 is a time chart showing an example of a state of operation of various components during execution of the internal combustion engine stop control according to the first embodiment of the present invention.

The content of internal combustion engine stop control according to the embodiment will be described with reference to FIG. 4. FIG. 4 shows an example of a time chart of a process in which the internal combustion engine stop control is executed during travel in the hybrid travel mode to transition into the electric travel mode. More specifically, FIG. 4 shows an example of a time chart of a process in which the brake pedal 91 is depressed to stop the internal combustion engine and to transition into a regeneration mode. In the "regeneration mode", which is included in the electric travel mode, the second rotary electric machine MG2 is caused to output torque (regenerative torque) in the direction to generate electricity. The "internal combustion engine stop control" is a generic term for various types of control executed by the various sections of the control device 70 to transition into the electric travel mode when the internal combustion engine stop conditions are established. In FIG. 4, it is assumed that the internal combustion engine stop conditions are established at time T0, and transition into the electric travel mode is completed at time T3.

Until time T0, the transfer torque capacity of the friction engagement device CL has such a value that brings the friction engagement device CL into the steady directly engaged state, the internal combustion engine E is in operation, and output torque of the internal combustion engine E is distributed to the sun gear s and the ring gear r. The first rotary electric machine MG1 functions to receive a reaction force of torque of the internal combustion engine E by outputting torque in the negative direction. In the example, the first rotary electric machine MG1 makes positive rotation to generate electricity. The second rotary electric machine MG2 outputs torque in the positive direction to supplement torque to be transferred to the output member O.

When the brake pedal 91 is depressed so that the internal combustion engine stop conditions are established at time T0, a command for the internal combustion engine control unit 3 to stop the internal combustion engine E is executed, and the rotational direction determination section 81 executes the rotational direction determination. In the embodiment, as described above, the first rotary electric machine MG1 makes positive rotation until time T0, and therefore it is determined in the rotational direction determination that the stop condition establishing rotational direction K1 is opposite to the subject rotational direction K2. Hence, in the example, the rotation reducing torque control section 82 executes the rotation reducing torque control. At and after time T0, the second rotary electric machine MG2 is controlled so as to output regenerative torque in the direction to generate electricity (in the example, in the negative direction). In the example, the fluctuation suppressing control is executed at least during a period since the internal combustion engine stop conditions are established until the drivable connection made by the friction engagement device CL is released. Therefore, the fluctuation suppressing torque has been added to the regenerative torque output from the second rotary electric machine MG2 during a period until the friction engagement device CL is brought into the disengaged state.

In the example shown in FIG. 4, execution of the rotation reducing torque control is started at time T1 when a predetermined time elapses from time T0. In the example, the rotation reducing torque output from the first rotary electric machine MG1 during execution of the rotation reducing torque control is torque in the negative direction, and therefore execution of the rotation reducing torque control reduces the rotational speed of the first rotary electric machine MG1 and the rotational speed of the internal combustion engine E.

When a predetermined time elapses after the time point (time T1) at which execution of the rotation reducing torque control is started so that the rotational speed of the first rotary electric machine MG1 reaches the connection release rotational speed Ni which falls within the connection release rotational speed range A (time T2), the rotation reducing torque control is stopped, and the connection release command section 83 issues a command to release engagement of the friction engagement device CL. When a command to release engagement of the friction engagement device CL is issued, the friction engagement device control unit 6 performs control so as to reduce the transfer torque capacity of the friction engagement device CL at a constant variation rate from the current value (such a value that brings the friction engagement device CL into the steady directly engaged state) to zero. As shown in FIG. 4, the regenerative torque output from the second rotary electric machine MG2 is varied in accordance with the fluctuation suppressing torque which is varied along with the transfer torque capacity of the friction engagement device CL. When the rotation reducing torque control is stopped, the first rotary electric machine MG1 is subjected to rotational speed feedback control such that the rotational speed of the first rotary electric machine MG1 becomes zero. At time T3, the rotational speed of the first rotary electric machine MG1 becomes zero. In the example, the rotational speed of the internal combustion engine E also becomes zero at time T3.

1-4. Process Procedures of Internal Combustion Engine Stop Control

Figure 5:
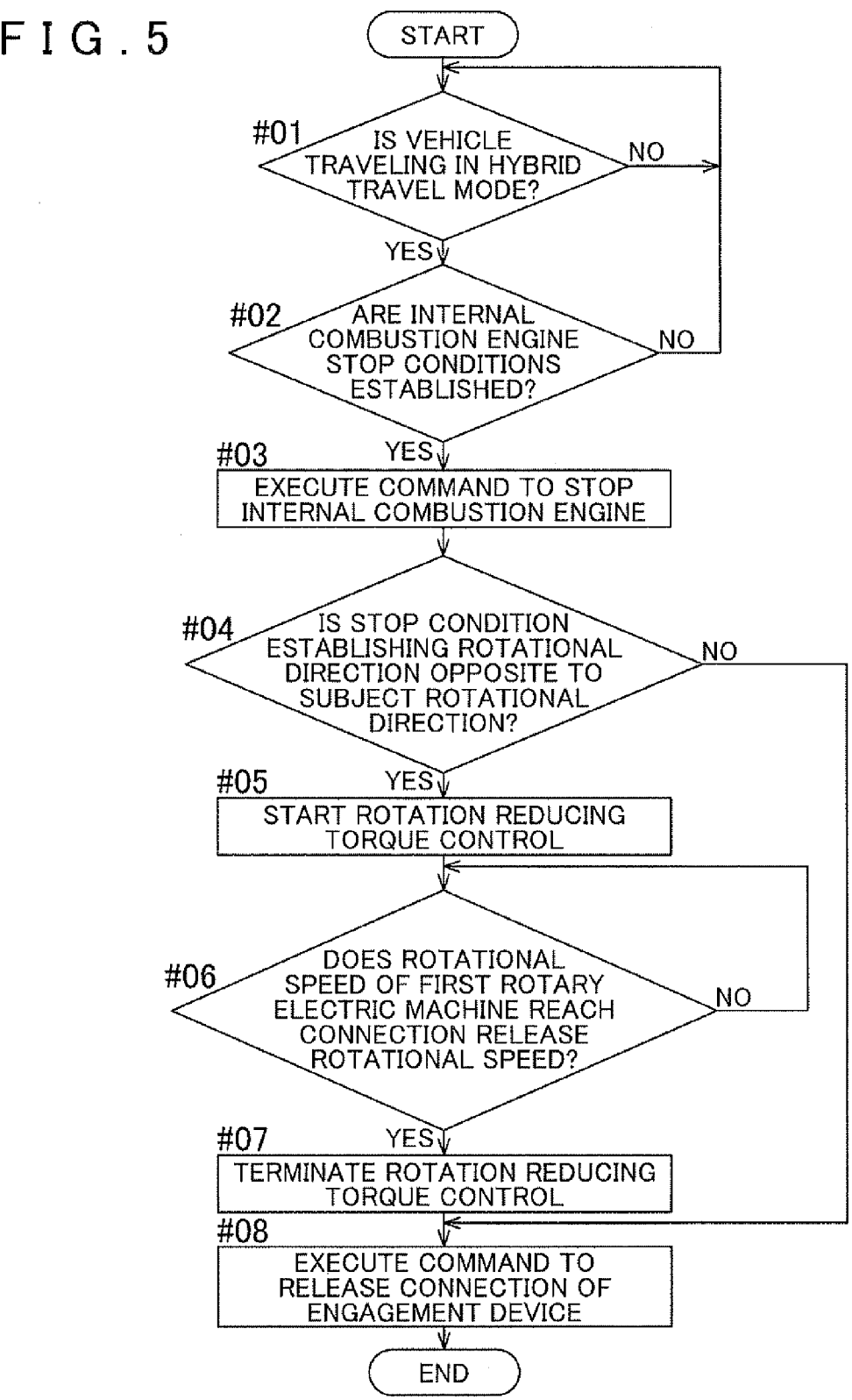
FIG. 5 is a flowchart showing the process procedures of the internal combustion engine stop control according to the first embodiment of the present invention.

Next, the process procedures of the internal combustion engine stop control according to the embodiment will be described with reference to the flowchart of FIG. 5. The process procedures described below are executed by the various functional sections of the control device 70. In the case where the functional sections are configured by a program, the arithmetic processing unit provided in the control device 70 operates as a computer that executes the program configuring the functional sections described above.

When the internal combustion engine stop conditions are established (step #02: Yes) during travel in the hybrid travel mode (step #01: Yes), a command for the internal combustion engine control unit 3 to stop the internal combustion engine E is executed (step #03), and the rotational direction determination section 81 makes a determination (rotational direction determination) as to whether or not the stop condition establishing rotational direction K1 is opposite to the subject rotational direction K2 (step #04). Steps #03 and #04 may be executed in parallel at the same time, or one of the steps may be executed first and the other may be executed thereafter.

If it is determined in step #04 that the stop condition establishing rotational direction K1 is opposite to the subject rotational direction K2 (step #04: Yes), the rotation reducing torque control section 82 starts the rotation reducing torque control (step #05). Execution of the rotation reducing torque control is continued during a period until the rotational speed of the first rotary electric machine MG1 reaches the connection release rotational speed Ni set within the connection release rotational speed range A (step #06: No). When it is stated that a subject rotational speed (for example, the rotational speed of the first rotary electric machine MG1) "reaches" a target value (target rotational speed), it is meant that the difference in rotational speed between the subject rotational speed and the target value becomes less than a target reach determination threshold. The target reach determination threshold is set to a value of 10 rpm or more and 100 rpm or less, for example.

When the rotational speed of the first rotary electric machine MG1 reaches the connection release rotational speed Ni (step #06: Yes), the rotation reducing torque control is terminated (stopped) (step #07), and a command to release connection of the friction engagement device CL (in the example, a command to release engagement of the friction engagement device CL) issued by the connection release command section 83 is executed (step #08). Steps #07 and #08 may be executed in parallel at the same time, or one of the steps may be executed first and the other may be executed thereafter.

If it is determined in step #04 that the stop condition establishing rotational direction K1 is not opposite to (that is, is the same as) the subject rotational direction K2 (step #04: No), the process proceeds to step #08, where a command to release engagement of the friction engagement device CL issued by the connection release command section 83 is executed. Thereafter, in the embodiment, the first rotary electric machine MG1 is controlled (for example, subjected to rotational speed feedback control) such that the rotational speed of the first rotary electric machine MG1 becomes zero.

2. Second Embodiment

Figure 6:
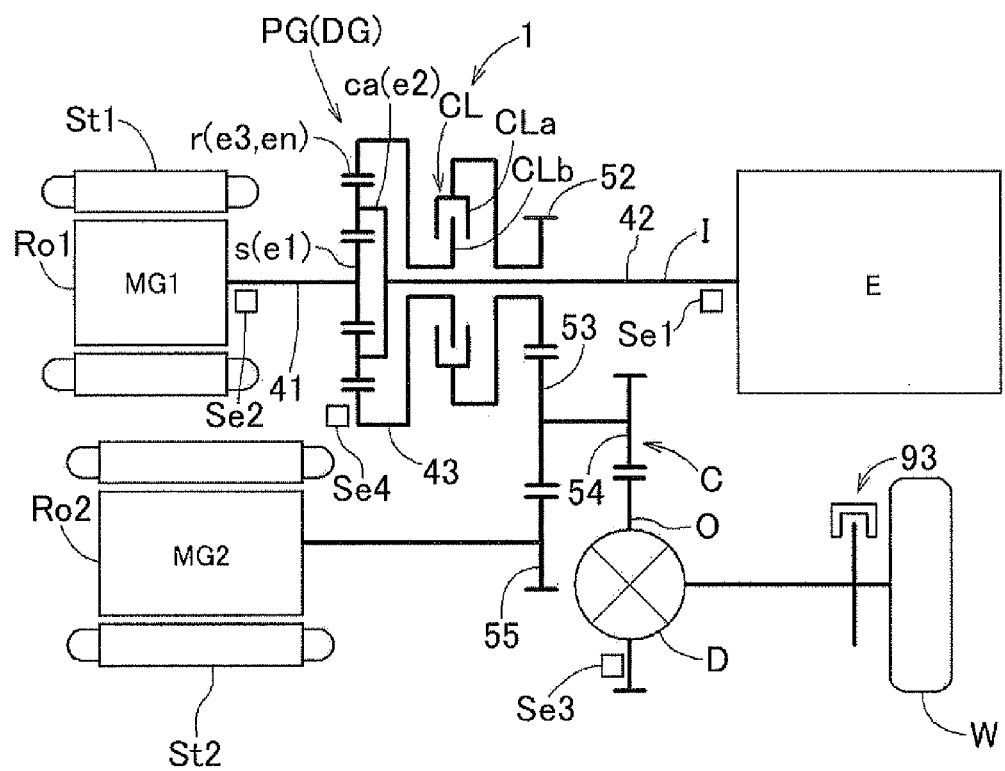
FIG. 6 is a skeleton diagram showing the mechanical configuration of a vehicle drive device according to a second embodiment of the present invention.

Next, a vehicle drive device according to a second embodiment of the present invention will be described with reference to FIGS. 6 and 7. As shown in FIG. 6, the vehicle drive device 1 according to the embodiment is basically configured in the same manner as that according to the first embodiment described above except for the position at which the friction engagement device CL is disposed. The differences between the configuration of the vehicle drive device 1 according to the embodiment and that according to the first embodiment described above will be mainly described below. The same elements as those in the first embodiment described above will not be specifically described.

In the vehicle drive device 1 according to the embodiment, as shown in FIG. 6, the friction engagement device CL is provided on a power transfer path between the output member O and the corresponding rotary element (third rotary element e3) of the differential gear device DG, rather than between the input member I and the corresponding rotary element (second rotary element e2) of the differential gear device DG. This makes the differential gear device DG capable of releasing the drivable connection between the output member O and the corresponding rotary element (third rotary element e3) of the differential gear device DG.

Specifically, the counter drive gear 52 is drivably coupled to the first engagement member CLa, which is one of the engagement members of the friction engagement device CL, to rotate together with the first engagement member CLa, and the third rotary element coupling member 43 is drivably coupled to the second engagement member CLb, which is the other engagement member of the friction engagement device CL, to rotate together with the second engagement member CLb. Hence, the friction engagement device CL is also positioned on a power transfer path between the second rotary electric machine MG2 and the corresponding rotary element (third rotary element e3) of the differential gear device DG, and the drivable connection between the second rotary electric machine MG2 and the corresponding rotary element (third rotary element e3) of the differential gear device DG is released by bringing the friction engagement device CL into the disengaged state in addition to the drivable connection between the output member O and the corresponding rotary element (third rotary element e3) of the differential gear device DG.

In the embodiment, the ring gear r serves as the rotary element to be released en, Therefore, as shown in FIG. 6, the rotary element-to-be-released sensor Se4 is disposed so as to be able to detect the rotational speed of the ring gear r. In the embodiment, the input member I is drivably coupled to the second rotary element coupling member 42 to rotate together with the second rotary element coupling member 42, and the rotational speed of the carrier ca is equal to the rotational speed of the internal combustion engine E at all times.

FIG. 7 is a velocity diagram illustrating operation of internal combustion engine stop control executed by the vehicle drive device 1 according to the embodiment. In FIG. 7, as in FIG. 3, the thick solid line represents a state of operation in the hybrid travel mode, the thin spaced broken line (thin dotted line) represents a state in which the rotational speed of the first rotary electric machine MG1 has reached the connection release rotational speed Ni, and the thick broken line represents a state of operation in the electric travel mode. In the embodiment, the friction engagement device CL is provided to selectively drivably couple the ring gear r to the output member O and the second rotary electric machine MG2. Therefore, in the example, after a command to release engagement of the friction engagement device CL is issued in the state indicated by the thin spaced broken line (thin dotted line), the rotational speed of the ring gear r, which has been made freely rotatable with the friction engagement device CL brought into the disengaged state, is reduced in accordance with a reduction in rotational speed of the first rotary electric machine MG1 and a reduction in rotational speed of the internal combustion engine E. In the electric travel mode, the rotational speed of the ring gear r is basically brought to zero.

3. Third Embodiment

Figure 8:
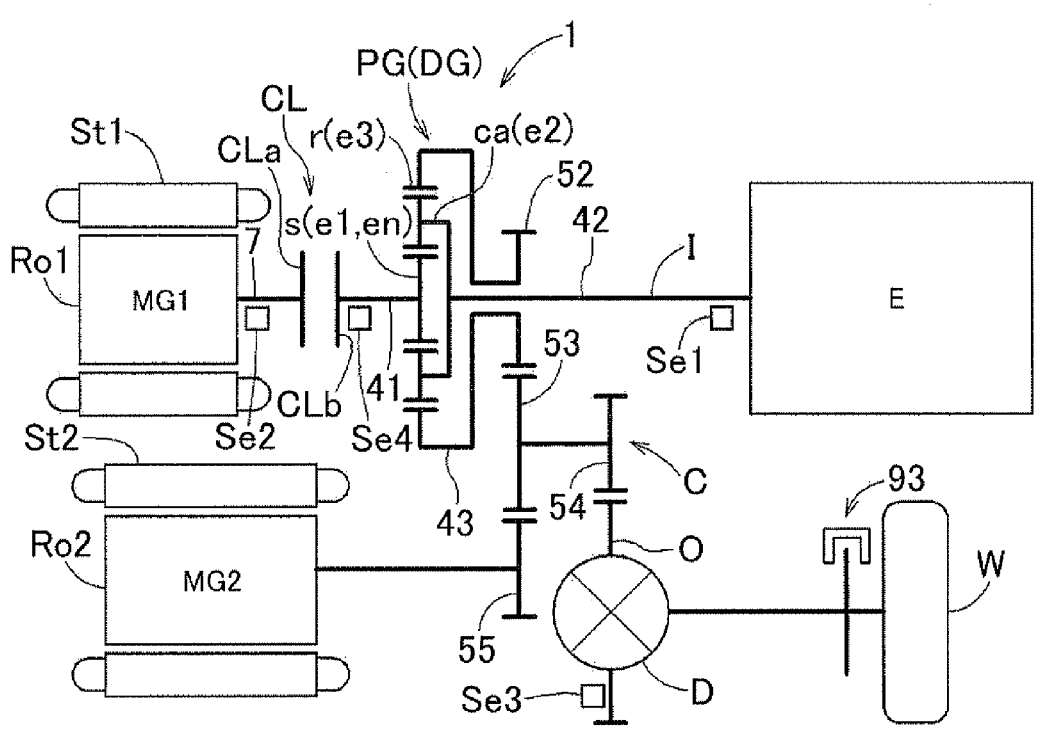
FIG. 8 is a skeleton diagram showing the mechanical configuration of a vehicle drive device according to a third embodiment of the present invention.

Next, a vehicle drive device according to a third embodiment of the present invention will be described with reference to FIGS. 8 and 9. As shown in FIG. 8, the vehicle drive device 1 according to the embodiment is basically configured in the same manner as that according to the first embodiment described above except for the position at which the friction engagement device CL is disposed. The differences between the configuration of the vehicle drive device 1 according to the embodiment and that according to the first embodiment described above will be mainly described below. The same elements as those in the first embodiment described above will not be specifically described.

In the vehicle drive device 1 according to the embodiment, as shown in FIG. 8, the friction engagement device CL is provided on a power transfer path between the first rotary electric machine MG1 and the corresponding rotary element (first rotary element e1) of the differential gear device DG, rather than between the input member I and the corresponding rotary element (second rotary element e2) of the differential gear device DG. This makes the differential gear device DG capable of releasing the drivable connection between the first rotary electric machine MG1 and the corresponding rotary element (first rotary element e1) of the differential gear device DG.

Specifically, the first rotor shaft 7 of the first rotary electric machine MG1 is drivably coupled to the first engagement member CLa, which is one of the engagement members of the friction engagement device CL, to rotate together with the first engagement member CLa, and the first rotary element coupling member 41 is drivably coupled to the second engagement member CLb, which is the other engagement member of the friction engagement device CL, to rotate together with the second engagement member CLb. In the embodiment, the sun gear s serves as the rotary element to be released en. Therefore, as shown in FIG. 8, the rotary element-to-be-released sensor Se4 is disposed so as to be able to detect the rotational speed of the sun gear s. In the embodiment, the input member I is drivably coupled to the second rotary element coupling member 42 to rotate together with the second rotary element coupling member 42, and the rotational speed of the carrier ca is equal to the rotational speed of the internal combustion engine E at all times.

Figure 9:
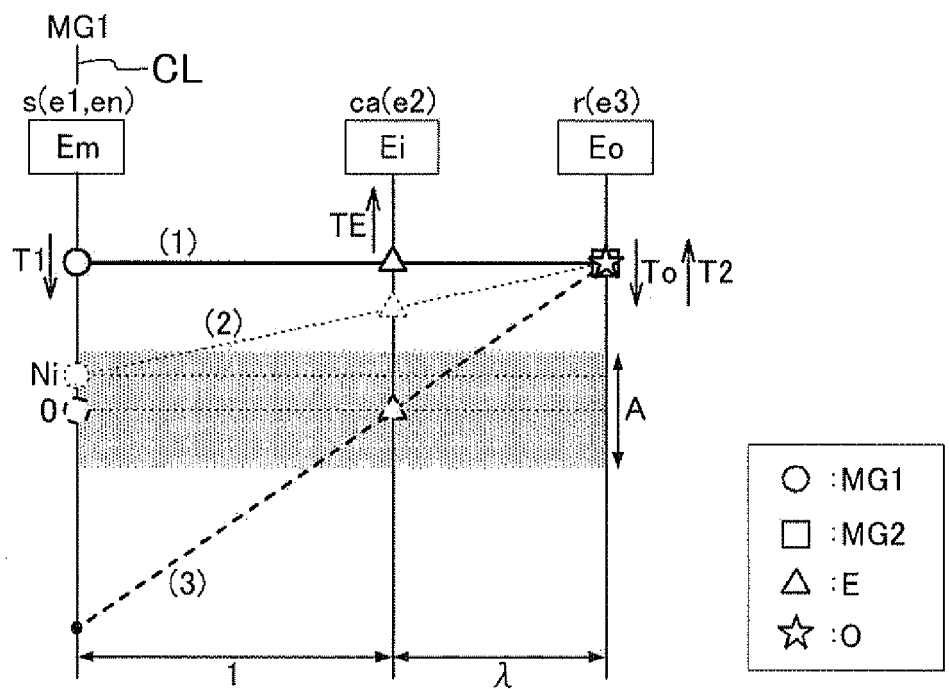
FIG. 9 is a velocity diagram illustrating operation of internal combustion engine stop control according to the third embodiment of the present invention.

FIG. 9 is a velocity diagram illustrating operation of internal combustion engine stop control executed by the vehicle drive device 1 according to the embodiment. In FIG. 9, as in FIG. 3, the thick solid line represents a state of operation in the hybrid travel mode, the thin spaced broken line (thin dotted line) represents a state in which the rotational speed of the first rotary electric machine MG1 has reached the connection release rotational speed Ni, and the thick broken line represents a state of operation in the electric travel mode. The thick broken circle which represents the first rotary electric machine MG1 represents the rotational speed of the first rotary electric machine MG1 in the electric travel mode. In the embodiment, the friction engagement device CL is provided to selectively drivably couple the sun gear s and the first rotary electric machine MG1 to each other. Therefore, in the example, after a command to release engagement of the friction engagement device CL is issued in the state indicated by the thin spaced broken line (thin dotted line), the rotational speed of the sun gear s, which has been made freely rotatable with the friction engagement device CL brought into the disengaged state, is reduced in accordance with a reduction in rotational speed of the internal combustion engine E. In the electric travel mode, the sun gear s rotates at a rotational speed determined on the basis of the vehicle speed (the rotational speed of the output member O).

4. Fourth Embodiment

Figure 10:
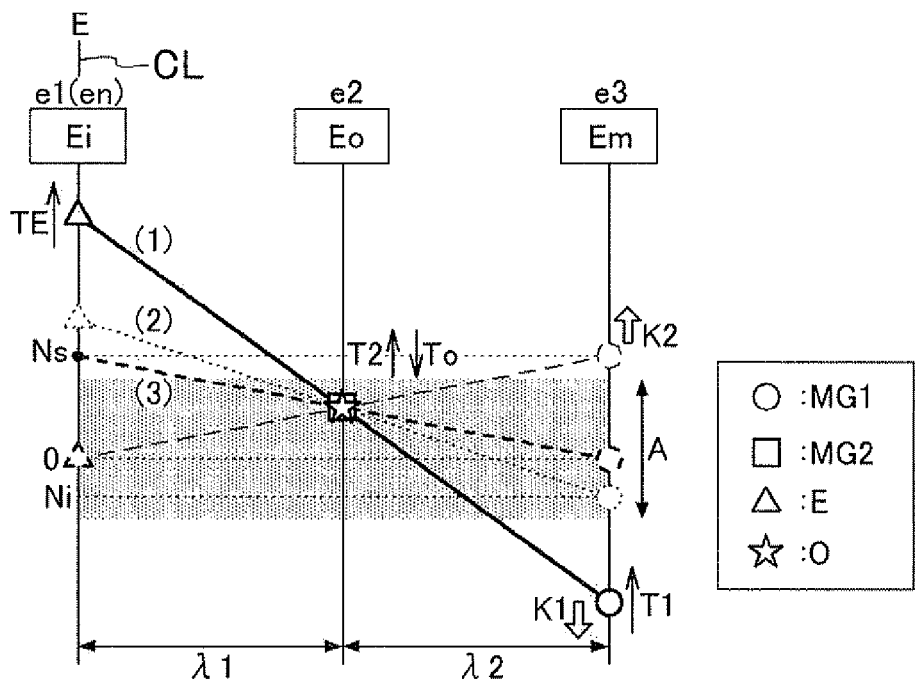
FIG. 10 is a velocity diagram illustrating operation of internal combustion engine stop control according to a fourth embodiment of the present invention.

In the first, second, and third embodiments described above, the first rotary electric machine MG1 is drivably coupled to the first rotary element e1, the input member I is drivably coupled to the second rotary element e2, and the second rotary electric machine MG2 and the output member O are drivably coupled to the third rotary element e3, via no other rotary element of the differential gear device DG. However, the present invention is not limited thereto. As shown in FIG. 10, the input member I may be drivably coupled to the first rotary element e1, the second rotary electric machine MG2 and the output member O may be drivably coupled to the second rotary element e2, and the first rotary electric machine MG1 may be drivably coupled to the third rotary element e3.

In the example shown in FIG. 10, unlike the first, second, and third embodiments described above, a torque converter mode in which torque obtained by amplifying output torque of the internal combustion engine E is transferred to the output member O is basically established in the hybrid travel mode in which the vehicle is run using output torque of both the internal combustion engine E and the rotary electric machines MG1 and MG2. In the embodiment, as in the first embodiment (FIG. 1) described above, the friction engagement device CL is provided on a power transfer path between the input member I and the corresponding rotary element (in the example, the first rotary element e1) of the differential gear device DG.

FIG. 10 is a velocity diagram illustrating operation of internal combustion engine stop control executed by the vehicle drive device 1 according to the embodiment. In the drawing, $\lambda 1$ and $\lambda 2$ represent the gear ratio of the differential gear device DG. The values of $\lambda 1$ and $\lambda 2$ are determined on the basis of the gear ratio of a differential gear mechanism forming the differential gear device DG. The notational system of the velocity diagram is the same as that in each of the embodiments discussed above, and therefore is not described in detail here. In the embodiment, unlike each of the embodiments described above, the order of the respective rotational speeds of the reaction force transfer element Em, the input rotary element Ei, and the output rotary element Eo is determined such that the rotational speed of the input rotary element Ei does not come between the respective rotational speeds of the other two. Therefore, the subject rotational direction K2 is the same as the rotational direction of the output member O. Hence, in the embodiment, in the case where the stop condition establishing rotational direction K1 is the negative direction, it is determined that the stop condition establishing rotational direction K1 is opposite to the subject rotational direction K2.

In the embodiment, unlike each of the embodiments described above, the order of the respective rotational speeds of the reaction force transfer element Em, the input rotary element Ei, and the output rotary element Eo is determined such that the rotational speed of the output rotary element Eo comes between the respective rotational speeds of the other two. Therefore, the direction of the rotation reducing torque is the positive direction. In such a configuration, it is suitable that the connection release rotational speed Ni should be set to a rotational speed that is equal to or less than zero (zero or negative) and that is included in the connection release rotational speed range A. In the example of FIG. 10, the connection release rotational speed Ni is set to a negative rotational speed included in the connection release rotational speed range A. In the example shown in FIG. 10, the connection release rotational speed range A is set so as to include both a rotational speed range in which the rotational speed is positive and a rotational speed range in which the rotational speed is negative. However, the connection release rotational speed range A may be set so as to include only a rotational speed range in which the rotational speed is negative in addition to zero.

Although not shown, the configuration shown in FIG. 10 may be modified such that the friction engagement device CL is provided on a power transfer path between the output member O and the second rotary electric machine MG2 and the corresponding rotary element (in the example, the second rotary element e2) of the differential gear device DG, or on a power transfer path between the first rotary electric machine MG1 and the corresponding rotary element (in the example, the third rotary element e3) of the differential gear device DG, rather than on a power transfer path between the input member I and the rotary element of the differential gear device DG.

5. Other Embodiments

Lastly, other embodiments of the present invention will be described. The characteristics disclosed in each of the following embodiments are not only applicable to that particular embodiment but also to any other embodiment unless any contradiction occurs.

(1) In each of the embodiments described above, the second rotary electric machine MG2 is drivably coupled to the rotary element of the differential gear device DG to which the output member O is drivably coupled, via no other rotary element of the differential gear device DG. However, the present invention is not limited thereto. The second rotary electric machine MG2 may be drivably coupled to a rotary element other than the rotary element of the differential gear device DG to which the output member O is drivably coupled, via no other rotary element of the differential gear device DG.

Figure 11:
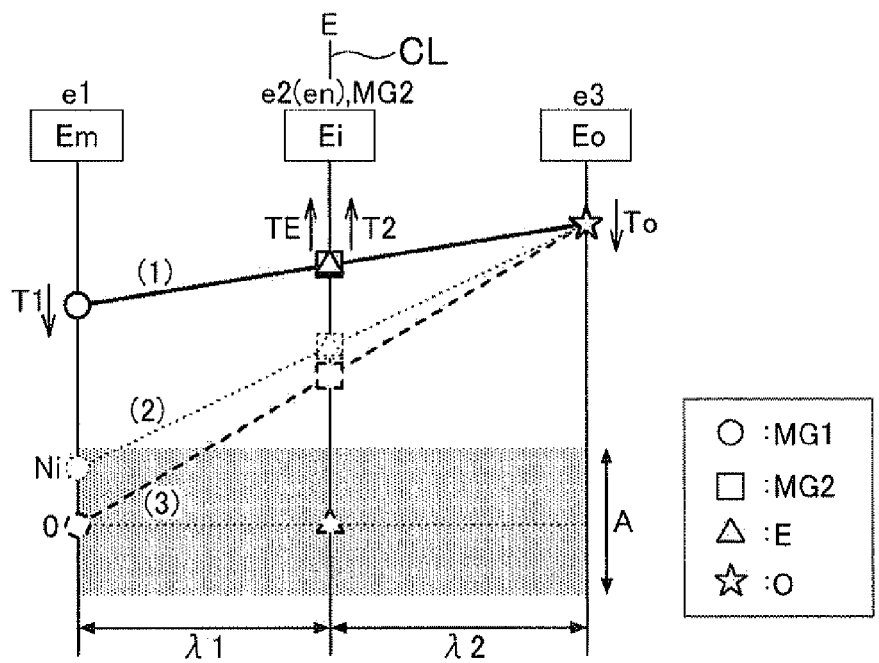
FIG. 11 is a velocity diagram illustrating operation of internal combustion engine stop control according to another embodiment of the present invention.

An example of such a configuration is shown in FIG. 11, in which the first rotary electric machine MG1 is drivably coupled to the first rotary element e1, the input member I and the second rotary electric machine MG2 are drivably coupled to the second rotary element e2, and the output member O is drivably coupled to the third rotary element e3, via no other rotary element of the differential gear device DG. In the configuration, the friction engagement device CL is provided on a power transfer path between the input member I and the rotary element (in the example, the second rotary element e2) of the differential gear device DG to which the input member I is drivably coupled via no other rotary element, but not positioned on a power transfer path between the second rotary electric machine MG2 and the corresponding rotary element (in the example, the second rotary element e2) of the differential gear device DG.

In the configuration in which the second rotary electric machine MG2 is drivably coupled to a rotary element other than the rotary element of the differential gear device DG to which the output member O is drivably coupled, via no other rotary element of the differential gear device DG as described above, unlike each of the embodiments described above, the first rotary electric machine MG1 functions to receive a reaction force of torque of the second rotary electric machine MG2 by outputting torque during execution of the electric travel mode.

As an example of the configuration in which the second rotary electric machine MG2 is drivably coupled to a rotary element other than the rotary element of the differential gear device DG to which the output member O is drivably coupled, via no other rotary element of the differential gear device DG, the configuration shown in FIG. 10 may be modified such that the second rotary electric machine MG2 is drivably coupled to the first rotary element e1, rather than to the second rotary element e2, although not shown. In this case, the friction engagement device CL is provided on a power transfer path between the input member I and the corresponding rotary element (in the example, the first rotary element e1) of the differential gear device DG to which the input member I is drivably coupled via no other rotary element, but not positioned on a power transfer path between the second rotary electric machine MG2 and the corresponding rotary element (in the example, the first rotary element e1) of the differential gear device DG.

(2) In each of the embodiments described above, the output member O basically rotates in the positive direction as with the internal combustion engine E during execution of the hybrid travel mode in which the vehicle is run utilizing output torque of the internal combustion engine E. However, the present invention is not limited thereto. For example, as shown in FIG. 12, the output member O may be configured to basically rotate in the negative direction unlike the internal combustion engine E during execution of the hybrid travel mode in which the vehicle is run utilizing output torque of the internal combustion engine E.

Figure 12:
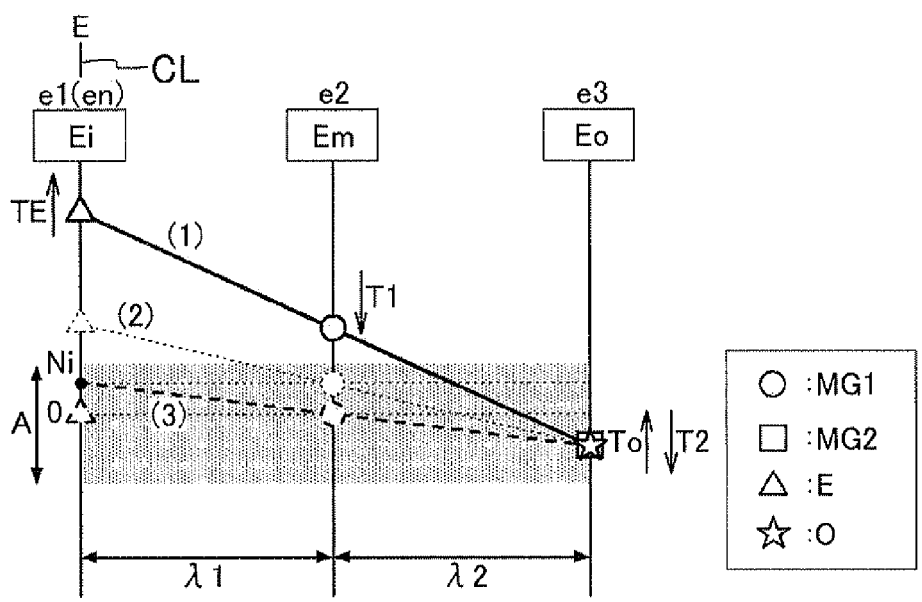
FIG. 12 is a velocity diagram illustrating operation of internal combustion engine stop control according to another embodiment of the present invention.

In the configuration shown in FIG. 12, the input member I is drivably coupled to the first rotary element e1, the first rotary electric machine MG1 is drivably coupled to the second rotary element e2, and the second rotary electric machine MG2 and the output member O are drivably coupled to the third rotary element e3, via no other rotary element of the differential gear device DG. In addition, the friction engagement device CL is provided on a power transfer path between the input member I and the rotary element (in the example, the first rotary element e1) of the differential gear device DG to which the input member I is drivably coupled via no other rotary element.

Although not shown, the configuration shown in FIG. 12 may be modified such that the friction engagement device CL is provided on a power transfer path between the first rotary electric machine MG1 and the corresponding rotary element (in the example, the second rotary element e2) of the differential gear device DG, or on a power transfer path between the output member O and the second rotary electric machine MG2 and the corresponding rotary element (in the example, the third rotary element e3) of the differential gear device DG, rather than on a power transfer path between the input member I and the corresponding rotary element of the differential gear device DG.

In the configuration shown in FIG. 12, the second rotary electric machine MG2 may be drivably coupled to the first rotary element e1, rather than to the third rotary element e3. In this case, the friction engagement device CL is provided on a power transfer path between the input member I and the corresponding rotary element (in the example, the first rotary element e1) of the differential gear device DG to which the input member I is drivably coupled via no other rotary element, but not positioned on a power transfer path between the second rotary electric machine MG2 and the corresponding rotary element (in the example, the first rotary element e1) of the differential gear device DG.

Figure 13:
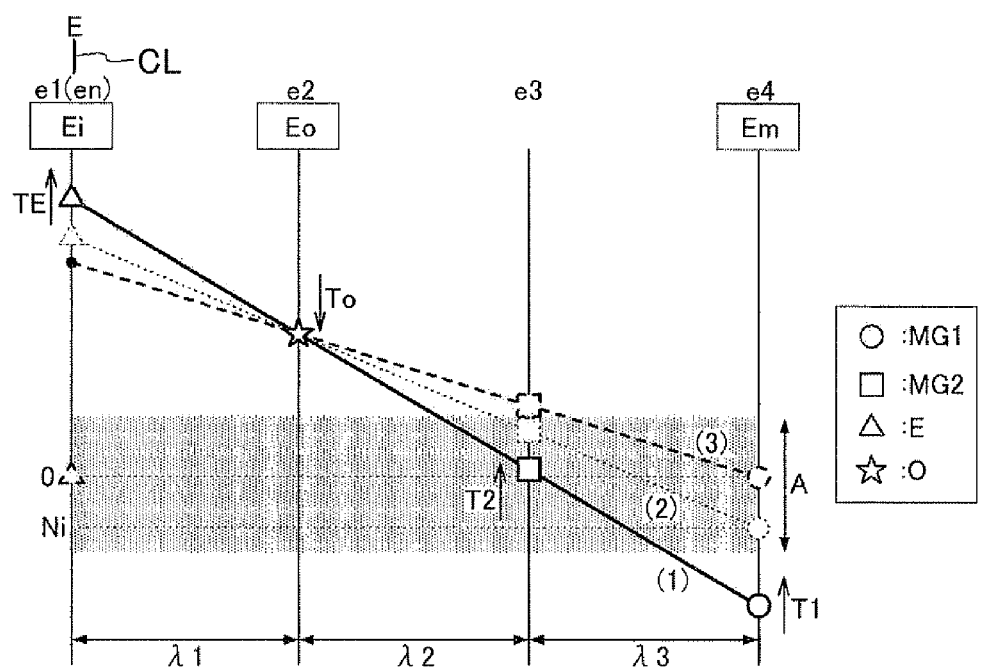
FIG. 13 is a velocity diagram illustrating operation of internal combustion engine stop control according to another embodiment of the present invention.
Figure 14:
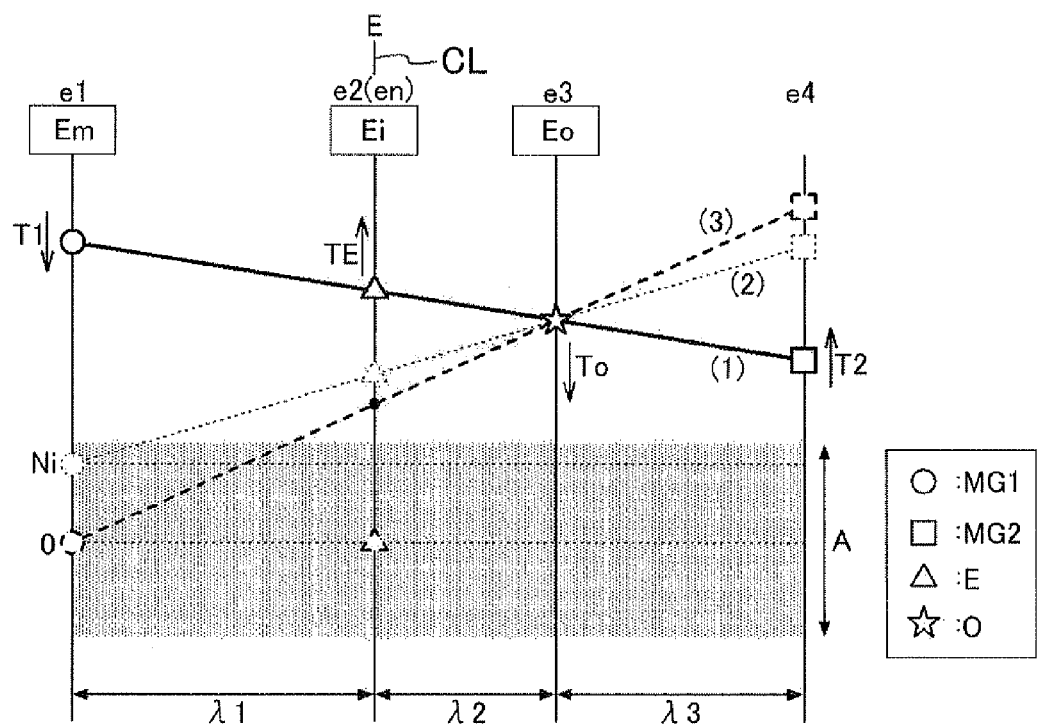
FIG. 14 is a velocity diagram illustrating operation of internal combustion engine stop control according to another embodiment of the present invention.

(3) In each of the embodiments described above, the differential gear device DG includes three rotary elements. However, the present invention is not limited thereto. The differential gear device DG may include four or more rotary elements. For example, as shown in FIGS. 13 to 15, the differential gear device DG may include four rotary elements, namely a first rotary element e1, a second rotary element e2, a third rotary element e3, and a fourth rotary element e4 in the order of rotational speed. In FIGS. 13 to 15, $\lambda 1$, $\lambda 2$, and $\lambda 3$ represent the gear ratio of the differential gear device DG. The values of $\lambda 1$, $\lambda 2$, and $\lambda 3$ are determined on the basis of the gear ratio of a differential gear mechanism forming the differential gear device DG.

In the examples shown in FIGS. 13 to 15, the input member I, the output member O, the first rotary electric machine MG1, and the second rotary electric machine MG2 are drivably coupled to different rotary elements of the differential gear device DG via no other rotary element of the differential gear device DG. That is, in the examples shown in FIGS. 13 to 15, unlike each of the embodiments described above, the second rotary electric machine MG2 is drivably coupled to a rotary element other than the respective rotary elements of the differential gear device DG to which the input member I, the output member O, and the first rotary electric machine MG1 are drivably coupled, via no other rotary element of the differential gear device DG.

Specifically, in the example shown in FIG. 13, the input member I is drivably coupled to the first rotary element e1, the output member O is drivably coupled to the second rotary element e2, the second rotary electric machine MG2 is drivably coupled to the third rotary element e3, and the first rotary electric machine MG1 is drivably coupled to the fourth rotary element e4, via no other rotary element of the differential gear device DG. In the example shown in FIG. 14, the first rotary electric machine MG1 is drivably coupled to the first rotary element e1, the input member I is drivably coupled to the second rotary element e2, the output member O is drivably coupled to the third rotary element e3, and the second rotary electric machine MG2 is drivably coupled to the fourth rotary element e4, via no other rotary element of the differential gear device DG. In the example shown in FIG. 15, the input member I is drivably coupled to the first rotary element e1, the first rotary electric machine MG1 is drivably coupled to the second rotary element e2, the second rotary electric machine MG2 is drivably coupled to the third rotary element e3, and the output member O is drivably coupled to the fourth rotary element e4, via no other rotary element of the differential gear device DG.

In the examples shown in FIGS. 13 to 15, the friction engagement device CL is provided on a power transfer path between the input member I and the corresponding rotary element of the differential gear device DG to which the input member I is drivably coupled via no other rotary element.

The configuration in which the differential gear device DG includes four rotary elements is not limited to the examples shown in FIGS. 13 to 15, and two of the rotary elements may be reversed in order in the configurations shown in FIGS. 13 to 15. For example, in the configuration shown in FIG. 13, the second rotary element e2 and the third rotary element e3 may be reversed in order. In the configuration shown in FIG. 14, in addition, the third rotary element e3 and the fourth rotary element e4 may be reversed in order. In the configuration shown in FIG. 14, further, the third rotary element e3 and the fourth rotary element e4 may be reversed in order, and thereafter the second rotary element e2 and the third rotary element e3 may be reversed in order.

(4) In each of the embodiments described above, the rotational speed of the first rotary electric machine MG1 at which the rotation reducing torque control is stopped is equal to the rotational speed of the first rotary electric machine MG1 at which the connection release command section 83 issues a command to release engagement of the friction engagement device CL. However, the present invention is not limited thereto. The rotational speed of the first rotary electric machine MG1 at which the rotation reducing torque control is stopped may be different from the rotational speed of the first rotary electric machine MG1 at which the connection release command section 83 issues a command to release engagement of the friction engagement device CL. That is, the rotation reducing torque control may be stopped before or after the connection release command section 83 issues a command to release engagement of the friction engagement device CL. In this case, the rotational speed of the first rotary electric machine MG1 at which the rotation reducing torque control is stopped may be set to a rotational speed not included in the connection release rotational speed range A.

(5) In each of the embodiments described above, rotation reducing torque control is stopped before the rotational direction of the first rotary electric machine MG1 becomes the same as the subject rotational direction K2. However, the present invention is not limited thereto. The rotation reducing torque control may be stopped after the rotational direction of the first rotary electric machine MG1 becomes the same as the subject rotational direction K2.

(6) In each of the embodiments described above, the engagement release command issued by the connection release command section 83 is executed before the rotational direction of the first rotary electric machine MG1 becomes the same as the subject rotational direction K2. However, the present invention is not limited thereto. The connection release rotational speed range A may be set so as to include a rotational speed range in which the rotational direction of the first rotary electric machine MG1 is the same as the subject rotational direction K2, and the engagement release command issued by the connection release command section 83 may be executed after the rotational direction of the first rotary electric machine MG1 becomes the same as the subject rotational direction K2.

(7) In each of the embodiments described above, the fluctuation suppressing control is executed at least during a period since the internal combustion engine stop conditions are established until the drivable connection made by the friction engagement device CL is released. However, the present invention is not limited thereto. The fluctuation suppression control may be not executed during a part or all of the period since the internal combustion engine stop conditions are established until the drivable connection made by the friction engagement device CL is released. Alternatively, in the case where the friction engagement device CL is in the engaged state (the slip engagement state or the directly engaged state) while the vehicle is traveling, the fluctuation suppressing control may be basically executed at all times.

(8) In the first, second, and third embodiments described above, the differential gear device DG is formed by the planetary gear mechanism PG of a single pinion type. However, the present invention is not limited thereto. The differential gear device DG may be formed by a planetary gear mechanism of a double pinion type or a planetary gear mechanism of a Ravigneaux type. Also in each of the embodiments in which the specific configuration of the differential gear device DG is not indicated (embodiments excluding the first, second, and third embodiments described above), the differential gear device DG may be formed by any mechanism. For example, the differential gear device DG including four or more rotary elements may be formed by two or more planetary gear mechanisms, some rotary elements of which are coupled to each other.

(9) In each of the embodiments described above, the friction engagement device CL is a friction engagement device that operates on a hydraulic pressure. However, the present invention is not limited thereto. The friction engagement device CL may be an electromagnetic friction engagement device, the engagement pressure of which is controlled in accordance with an electromagnetic force. In each of the embodiments described above, in addition, the engagement device according to the present invention is implemented by the friction engagement device CL. However, the engagement device according to the present invention may be implemented by a meshing-type engagement device (dog clutch).

(10) In each of the embodiments described above, the internal combustion engine control unit 3, the friction engagement device control unit 6, and the brake device control unit 8 are provided separately from the control device 70. However, the present invention is not limited thereto. At least one of the control units may be integrated in the control device 70. The configuration of the functional sections described in relation to the embodiments described above is merely illustrative, and a plurality of functional sections may be combined with each other, or a single functional section may be further divided into sub-sections.

(11) Also regarding other configurations, the embodiments disclosed herein are illustrative in all respects, and the present invention is not limited thereto. That is, it is a matter of course that a configuration obtained by appropriately altering part of a configuration not disclosed in the claims of the present invention also falls within the technical scope of the present invention as long as the resulting configuration includes a configuration disclosed in the claims or a configuration equivalent thereto.

The present invention may be suitably applied to a vehicle drive device including an input member drivably coupled to an internal combustion engine, an output member drivably coupled to wheels, a first rotary electric machine, a second rotary electric machine, a differential gear device including at least three rotary elements, and a control device.

What is claimed is:

1. A vehicle drive device comprising: an input member drivably coupled to an internal combustion engine; an output member drivably coupled to wheels; a first rotary electric machine; a second rotary electric machine; a differential gear device including at least three rotary elements; a control device; and an engagement device, wherein the input member, the output member, and the first rotary electric machine are drivably coupled to different rotary elements of the differential gear device via no other rotary element of the differential gear device, the second rotary electric machine is drivably coupled to one of the rotary elements of the differential gear device other than the rotary element to which the first rotary electric machine is drivably coupled, via no other rotary element of the differential gear device, the engagement device is capable of releasing drivable connection between one of the input member, the output member, and the first rotary electric machine and the corresponding rotary element of the differential gear device, and the control device includes a rotational direction determination section that, when internal combustion engine stop conditions for stopping the internal combustion engine are established in a state in which the drivable connection made by the engagement device is maintained, the internal combustion engine is in operation, and the output member is rotating, determines whether or not a stop condition establishing rotational direction, which is a rotational direction of the first rotary electric machine at the time when the internal combustion engine stop conditions are established, is opposite to a subject rotational direction, which is a rotational direction of the first rotary electric machine at an operation point at which a rotational speed of the internal combustion engine becomes zero, a rotation reducing torque control section that executes rotation reducing torque control in which the first rotary electric machine is caused to output rotation reducing torque in a direction to reduce the rotational speed of the internal combustion engine on condition that it is determined that the stop condition establishing rotational direction is opposite to the subject rotational direction, and a connection release command section that issues a command to release the drivable connection made by the engagement device on condition that the rotational speed of the first rotary electric machine falls within a connection release rotational speed range set so as to include zero.

2. The vehicle drive device according to claim 1, wherein the connection release command section issues the command to release the drivable connection made by the engagement device before the rotational direction of the first rotary electric machine becomes the same as the subject rotational direction.

3. The vehicle drive device according to claim 2, wherein the rotation reducing torque control section stops the rotation reducing torque control before the rotational direction of the first rotary electric machine becomes the same as the subject rotational direction.

4. The vehicle drive device according to claim 3, wherein the control device executes fluctuation suppressing control in which the second rotary electric machine is caused to output fluctuation suppressing torque for suppressing torque fluctuations to be transferred to the output member via the differential gear device because of variations in state of operation of the first rotary electric machine or variations in state of engagement of the engagement device.

5. The vehicle drive device according to claim 4, wherein the second rotary electric machine is drivably coupled to the rotary element of the differential gear device to which the output member is drivably coupled, via no other rotary element of the differential gear device.

6. The vehicle drive device according to claim 5, wherein the differential gear device includes three rotary elements that are a first rotary element, a second rotary element, and a third rotary element in the order of rotational speed, the first rotary electric machine is drivably coupled to the first rotary element, the input member is drivably coupled to the second rotary element, and the second rotary electric machine and the output member are drivably coupled to the third rotary element, via no other rotary element of the differential gear device, and the engagement device is provided on a power transfer path between the input member and the second rotary element.

7. The vehicle drive device according to claim 1, wherein the second rotary electric machine is drivably coupled to one of the rotary elements of the differential gear device other than the rotary element to which the first rotary electric machine is drivably coupled or the rotary element to which the output member is drivably coupled, via no other rotary element of the differential gear device, and the engagement device is provided on a power transfer path between the input member and the rotary element of the differential gear device to which the input member is drivably coupled via no other rotary element.

8. The vehicle drive device according to claim 1, wherein the control device executes fluctuation suppressing control in which the second rotary electric machine is caused to output fluctuation suppressing torque for suppressing torque fluctuations to be transferred to the output member via the differential gear device because of variations in state of operation of the first rotary electric machine or variations in state of engagement of the engagement device.

9. The vehicle drive device according to claim 1, wherein the second rotary electric machine is drivably coupled to the rotary element of the differential gear device to which the output member is drivably coupled, via no other rotary element of the differential gear device.

10. The vehicle drive device according to claim 1, wherein the differential gear device includes three rotary elements that are a first rotary element, a second rotary element, and a third rotary element in the order of rotational speed,
the first rotary electric machine is drivably coupled to the first rotary element, the input member is drivably coupled to the second rotary element, and the second rotary electric machine and the output member are drivably coupled to the third rotary element, via no other rotary element of the differential gear device, and
the engagement device is provided on a power transfer path between the input member and the second rotary element.

11. The vehicle drive device according to claim 2, wherein the control device executes fluctuation suppressing control in which the second rotary electric machine is caused to output fluctuation suppressing torque for suppressing torque fluctuations to be transferred to the output member via the differential gear device because of variations in state of operation of the first rotary electric machine or variations in state of engagement of the engagement device.

12. The vehicle drive device according to claim 2, wherein the second rotary electric machine is drivably coupled to the rotary element of the differential gear device to which the output member is drivably coupled, via no other rotary element of the differential gear device.

13. The vehicle drive device according to claim 2, wherein the differential gear device includes three rotary elements that are a first rotary element, a second rotary element, and a third rotary element in the order of rotational speed,
the first rotary electric machine is drivably coupled to the first rotary element, the input member is drivably coupled to the second rotary element, and the second rotary electric machine and the output member are drivably coupled to the third rotary element, via no other rotary element of the differential gear device, and
the engagement device is provided on a power transfer path between the input member and the second rotary element.

14. The vehicle drive device according to claim 2, wherein the second rotary electric machine is drivably coupled to one of the rotary elements of the differential gear device other than the rotary element to which the first rotary electric machine is drivably coupled or the rotary element to which the output member is drivably coupled, via no other rotary element of the differential gear device, and
the engagement device is provided on a power transfer path between the input member and the rotary element of the differential gear device to which the input member is drivably coupled via no other rotary element.

15. The vehicle drive device according to claim 3, wherein the second rotary electric machine is drivably coupled to the rotary element of the differential gear device to which the output member is drivably coupled, via no other rotary element of the differential gear device.

16. The vehicle drive device according to claim 3, wherein the differential gear device includes three rotary elements that are a first rotary element, a second rotary element, and a third rotary element in the order of rotational speed,
the first rotary electric machine is drivably coupled to the first rotary element, the input member is drivably coupled to the second rotary element, and the second rotary electric machine and the output member are drivably coupled to the third rotary element, via no other rotary element of the differential gear device, and
the engagement device is provided on a power transfer path between the input member and the second rotary element.

17. The vehicle drive device according to claim 3, wherein the second rotary electric machine is drivably coupled to one of the rotary elements of the differential gear device other than the rotary element to which the first rotary electric machine is drivably coupled or the rotary element to which the output member is drivably coupled, via no other rotary element of the differential gear device, and
the engagement device is provided on a power transfer path between the input member and the rotary element of the differential gear device to which the input member is drivably coupled via no other rotary element.

18. The vehicle drive device according to claim 8, wherein the second rotary electric machine is drivably coupled to the rotary element of the differential gear device to which the output member is drivably coupled, via no other rotary element of the differential gear device.

19. The vehicle drive device according to claim 18, wherein
the differential gear device includes three rotary elements that are a first rotary element, a second rotary element, and a third rotary element in the order of rotational speed,
the first rotary electric machine is drivably coupled to the first rotary element, the input member is drivably coupled to the second rotary element, and the second rotary electric machine and the output member are drivably coupled to the third rotary element, via no other rotary element of the differential gear device, and
the engagement device is provided on a power transfer path between the input member and the second rotary element.

20. The vehicle drive device according to claim 8, wherein the second rotary electric machine is drivably coupled to one of the rotary elements of the differential gear device other than the rotary element to which the first rotary electric machine is drivably coupled or the rotary element to which the output member is drivably coupled, via no other rotary element of the differential gear device, and
the engagement device is provided on a power transfer path between the input member and the rotary element of the differential gear device to which the input member is drivably coupled via no other rotary element.

* * * * *